United States Patent
Lu et al.

(10) Patent No.: US 12,229,062 B2
(45) Date of Patent: Feb. 18, 2025

(54) ERRONEOUS SELECT DIE ACCESS (SDA) DETECTION

(71) Applicant: Micron Technology, Inc., Boise, ID (US)

(72) Inventors: Yang Lu, Boise, ID (US); Creston M. Dupree, Boise, ID (US); Kang-Yong Kim, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 105 days.

(21) Appl. No.: 17/823,432

(22) Filed: Aug. 30, 2022

(65) Prior Publication Data

US 2024/0070096 A1    Feb. 29, 2024

(51) Int. Cl.
  *G06F 13/16* (2006.01)
  *G06F 11/07* (2006.01)

(52) U.S. Cl.
  CPC ...... *G06F 13/1689* (2013.01); *G06F 11/0772* (2013.01); *G06F 13/1663* (2013.01)

(58) Field of Classification Search
  CPC ............. G06F 13/1689; G06F 13/1663; G06F 11/0772
  See application file for complete search history.

(56) References Cited

U.S. PATENT DOCUMENTS

| | | | | |
|---|---|---|---|---|
| 10,162,406 | B1* | 12/2018 | Mazumder | .............. G06F 3/002 |
| 2013/0077429 | A1* | 3/2013 | Kondo | ..................... G11C 7/24 |
| | | | | 365/230.01 |

* cited by examiner

*Primary Examiner* — Gary W. Cygiel
(74) *Attorney, Agent, or Firm* — Colby Nipper PLLC

(57) ABSTRACT

Described apparatuses and methods relate to erroneous select die access (SDA) detection for a memory system. A memory system may include a memory controller and a memory device that are capable of implementing an SDA protocol that enables selective memory die access to multiple memory devices that couple to a command bus. A memory device can include logic that determines if signaling that conflicts with the SDA protocol is detected. If it is determined that conflicting signaling is detected, the logic may provide an indication of the conflicted signaling. In doing so, the erroneous SDA detection described herein may reduce the likelihood of a memory device erroneously masking memory dice, thereby limiting the memory device from exhibiting unexpected, and in some cases, dangerous behavior.

40 Claims, 11 Drawing Sheets

900 ⟶

```
┌─────────────────────────────────────────────┐
│ Before receiving a first command to enable  │
│ a protocol related to masking a die of      │
│ multiple memory dice, receive a second      │
│ command to mask the die                     │
│                    902                      │
└─────────────────────────────────────────────┘
                      │
                      ▼
┌─────────────────────────────────────────────┐
│    Detect signaling that conflict with the  │
│       protocol related to masking the die   │
│                    904                      │
└─────────────────────────────────────────────┘
                      │
                      ▼
┌─────────────────────────────────────────────┐
│ Provide an indication of the detected       │
│ signaling that conflicts with the protocol  │
│ related to masking the dice                 │
│                    906                      │
└─────────────────────────────────────────────┘
```

```
┌─────────────────────────────────────────────────┐
│ Transmit signaling indicative of a first command to enable a │
│ protocol related to detecting signaling that conflicts with a │
│ protocol related to masking a die of multiple memory dice │
│                      1002                       │
└─────────────────────────────────────────────────┘
                          │
                          ▼
┌─────────────────────────────────────────────────┐
│     Transmit signaling indicative of a request      │
│        to read a value from a first register        │
│                      1004                       │
└─────────────────────────────────────────────────┘
                          │
                          ▼
┌─────────────────────────────────────────────────┐
│          Receive signaling indicative of the          │
│        first value from the first register          │
│                      1006                       │
└─────────────────────────────────────────────────┘
                          │
                          ▼
┌─────────────────────────────────────────────────┐
│            Perform an error handling process            │
│                      1008                       │
└─────────────────────────────────────────────────┘
```

FIG. 10

ERRONEOUS SELECT DIE ACCESS (SDA) DETECTION

BACKGROUND

Computers, smartphones, and other electronic devices rely on processors and memories. A processor executes code based on data to run applications and provide features to a user. The processor obtains the code and the data from a memory. The memory in an electronic device can include volatile memory (e.g., random-access memory (RAM)) and nonvolatile memory (e.g., flash memory). Like the number of cores or speed of a processor, a rate at which data can be accessed, as well as a delay in accessing it, can impact the performance of an electronic device. This impact on performance increases as processors are developed that execute code faster and as applications on electronic devices operate on ever-larger data sets that require ever-larger memories.

BRIEF DESCRIPTION OF THE DRAWINGS

This document describes apparatuses and techniques for erroneous select die access (SDA) detection with reference to the following drawings. The same numbers are used throughout the drawings to reference like features and components:

FIGS. 6-1 and 6-2 illustrate an example memory rank of a memory device including control logic that can implement one or more aspects of erroneous SDA detection;

FIG. 9 illustrates an example method performed by a memory device for implementing erroneous SDA detection; and FIG. 10 illustrates an example method performed by a memory controller for implementing erroneous SDA detection.

DETAILED DESCRIPTION

Overview

Figure 1:
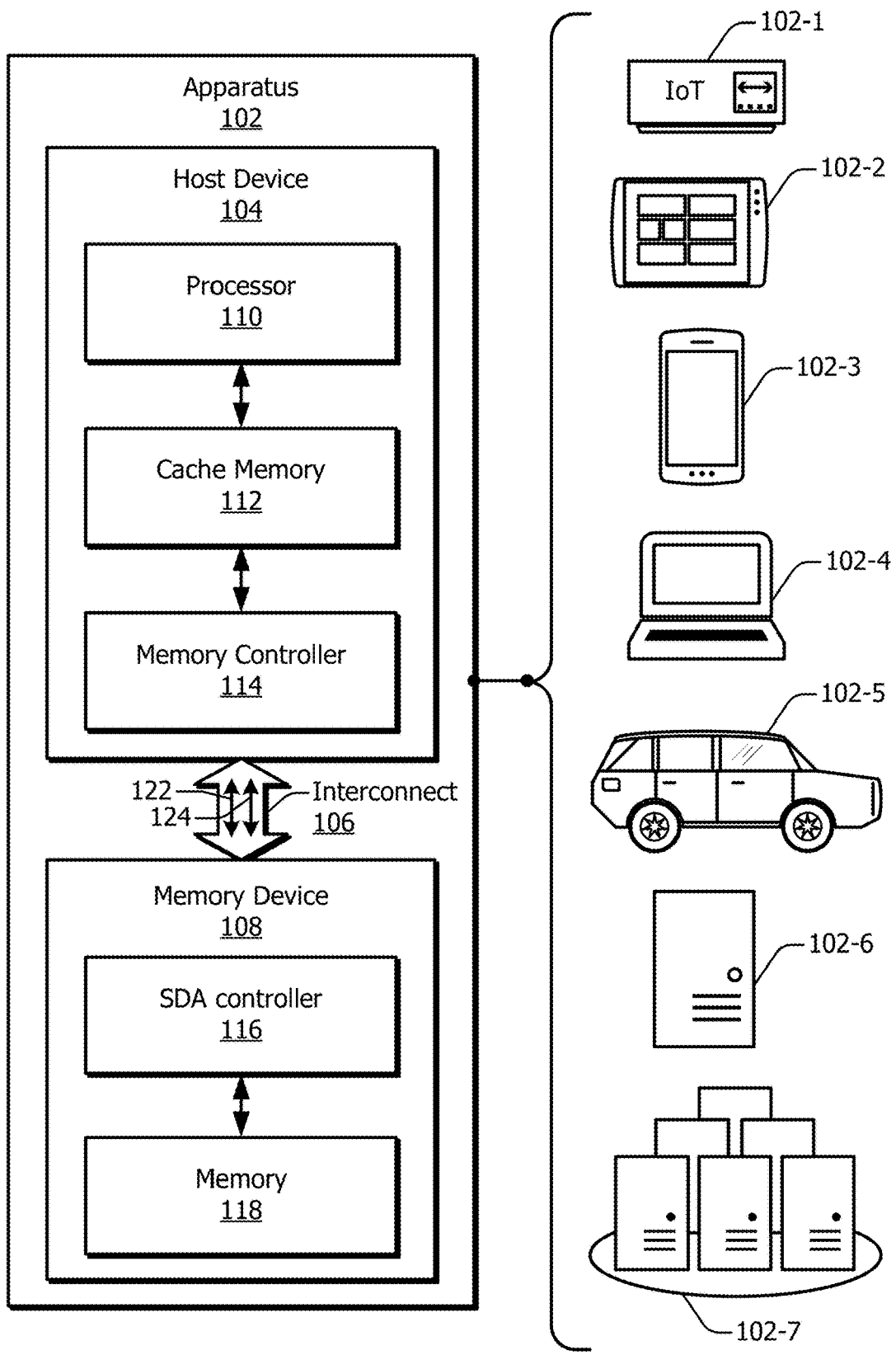
FIG. 1 illustrates an example operating environment including apparatuses that can implement erroneous SDA detection.

As electronic devices continue to improve, memory devices are continually driven to maintain larger amounts of data, and improved communications protocols are developed to support higher rates of data transfer between processors and these memory devices. An example of such an improved protocol is the Compute Express Link® (CXL®) protocol or standard (referred to hereinafter as "the CXL protocol" or "the CXL standard"). The CXL protocol can be implemented over a physical layer that is governed by, for instance, the PCIe ° (Peripheral Component Interconnect Express) protocol. The CXL protocol targets intensive workloads for processors and memory devices (e.g., accelerators, memory expanders), where efficient, coherent memory accesses or interactions between processors and memory is advantageous.

The CXL protocol addresses some of the limitations of PCIe links by providing an interface that leverages, for example, the PCIe 5.0 physical layer and electricals, while providing lower-latency paths for memory access and coherent caching between processors and memory devices. It offers high-bandwidth, low-latency connectivity between host devices (e.g., processors, CPUs, SoCs) and memory devices (e.g., accelerators, memory expanders, memory buffers, smart input/output (I/O) devices). The CXL protocol also addresses growing high-performance computational workloads by supporting heterogeneous processing and memory systems with potential applications in artificial intelligence, machine learning, communication systems, and other high-performance computing. With the increase in memory density to utilize improved communication protocols, such as CXL, memory devices may be designed with additional design constraints that create new challenges within the memory device.

Generally, memory devices may be implemented in different forms and deployed in various environments. For example, memory devices can be secured to a printed circuit board (PCB), such as a motherboard. The PCB can include sockets for accepting at least one processor and one or more memories and various wiring infrastructure that enables communication between two or more components. The PCB, however, offers a finite area for the sockets and the wiring infrastructure. Some PCBs include sockets that are shaped into linear slots and are designed to accept multiple double-inline memory modules (DIMMs). These sockets can be fully occupied by DIMMs while a processor is still able to utilize more memory. In such situations, if more memory were available, the system could have improved performance, for example, by providing enhanced features, such as high-resolution graphics and artificial intelligence.

To save space on the memory device, some memory devices may be implemented with multiple memory dice connected to a single command bus, for example, a command address (CA) bus. Take, for example, double data rate synchronous dynamic random-access memory (DDR SDRAM), including low-power DDR (LPDDR) SDRAM, and more specifically LPDDR5. In the LPDDR5 standard, memory density may be so high that PCB space is constrained such that individual CA pins are not available to each memory die. In this case, a CA bus may be implemented as a CA bus that is common to multiple memory dice ("common CA bus"). Given that these multiple memory dice are coupled to a common CA bus, a processor may access these memory dice in a group, or additional solutions may be involved to enable individual access (or select access of multiple dice) to the multiple memory dice.

One such solution to enable individual or select access to multiple dice sharing the same CA bus is through a select die access (SDA) protocol. At a high level, the SDA protocol enables selective masking of one or more dice sharing the same CA bus to disable the selected die from receiving, or at least to prevent the selected die from performing a command responsive to, a command transmitted along the CA bus. As a general example of the SDA protocol, a command may be transmitted from a memory controller to a memory device to enter the SDA protocol (e.g., on the memory device as a whole or on the specific channel/rank) and enable a command to select and mask a subset of dice connected along the same CA bus. Specifically, a mode register write (MRW) command may be transmitted that changes the value of a mode register that defines the state of the SDA protocol (e.g., enabled or disabled). In doing so, the mode register may store a value indicative of an enabled state of the SDA protocol, and the memory device may mask select dice in response to commands from the memory controller to do so. It should be noted that an MRW command is used in this disclosure to indicate a command that enables the SDA protocol, however, other commands not classified as MRW commands may be used to enable the SDA protocol without extending beyond the scope of this disclosure.

In general, a command to mask one or more dice may be transmitted in temporal proximity to the command to enable the SDA protocol. In one example, the memory controller may transmit a multi-purpose command (MPC) to the memory device that, when the SDA protocol is enabled, instructs select dice to mask themselves. In this document, the MPC may be used to describe a command that may be used to mask one or more dice; however, it should be appreciated that other commands that are not classified as MPCs may be used to mask the one or more dice without extending beyond the teaching of this document. The memory device may respond by masking the select dice, thereby enabling only the remaining, unmasked dice to receive, or respond to, commands transmitted along the CA bus. In this way, the SDA protocol may be particularly beneficial in some applications by enabling individual or selective die access to high-density memory sharing a common CA bus, which may be required (or highly beneficial) for some memory operations, such as post package repair (PPR), trim by die, and trim per byte operations.

While intentional use of the SDA protocol may provide various benefits to the memory device, erroneous entrance into the SDA protocol may cause the memory device to perform unpredictable, and in some cases, dangerous operations. For example, in the instance of using an MPC to select the appropriate dice to mask along a CA bus when the SDA protocol is enabled, this same signaling indicative of the MPC may cause a different operation to be performed by the memory device when the SDA protocol is disabled. As such, if the SDA protocol is erroneously enabled, and the memory controller transmits the MPC command to cause the memory device to perform the operations unrelated to the SDA protocol, the memory device may erroneously mask one or more of the multiple memory dice coupled to the common CA bus. In doing so, the select memory dice that have been masked may not perform operations in response to future commands transmitted along the CA bus, thereby causing the memory device to perform unexpectedly and return incomplete or incorrect data.

In other implementations, the MPC may only cause a response when the SDA protocol is enabled and, when transmitted to a memory device that does not have the SDA protocol enabled, the MPC may not cause any operations to be performed by the memory device. However, the signaling indicative of the MPC may be similar to (e.g., differ by a small number of bits from) other signaling indicative of valid commands that are transmitted when the SDA protocol is disabled. As such, the transmission of signaling indicative of one of these valid commands may be received at the memory device as the MPC command when bit errors are present in the signals. In a case in which the memory device has erroneously/unintentionally entered the SDA protocol, this signal may cause the memory device to mask one or more memory dice, and in the future, disable these memory dice from responding to commands along the CA bus. Like in the above example, this may cause the memory device to perform unexpectedly, return data that is incomplete or incorrect, or cause failures in the system that the memory device supports.

Consider an example implementation including a host device coupled to a memory device that includes control circuitry that can perform erroneous SDA detection. A memory controller (e.g., logic that is separate from or part of the host device) may command the memory device to enable erroneous SDA detection. When enabled, erroneous SDA detection may be controlled by a controller (e.g., a collection of logical circuitries) of the memory device that can determine when unintended signaling associated with the SDA protocol is received. For example, the controller may determine that a command to enable the SDA protocol (e.g., an MRW command) is received by the memory device, but that a command to mask one or more memory dice (e.g., an MPC) has not been received after passage of a predetermined period of time. Because an MPC command is usually issued in temporal proximity to (e.g., shortly after) the MRW command, the described situation may suggest that the SDA protocol was enabled erroneously. Alternatively or additionally, the controller may determine that a command to mask one or more memory dice is issued before the SDA protocol is enabled. In this case, because the MPC command may be meaningless outside the SDA protocol, this may indicate that the SDA protocol should have been enabled (and, thus, that the lack of enablement is erroneous), or that the MPC command was issued erroneously.

In either example, the controller may determine that signaling that conflicts with the SDA protocol has been detected (e.g., signaling that is associated with the SDA protocol was received by the memory device, and that the signaling is erroneous or uncharacteristic). In response, the controller may raise a flag (e.g., store a value in a register) that indicates that the memory device has erroneously received signaling associated with the SDA protocol. The memory controller may periodically request to read the flag from the memory device and perform an error handling process in response to determining that the flag has been raised.

In some instances, it may be beneficial for the controller to automatically disable the SDA protocol when the determination is made that signaling that conflicts with the SDA protocol has been detected to ensure that memory dice are not masked erroneously. In this case, the memory controller may send signaling to the memory device to enable the automatic exit protocol that is capable of automatically disabling the SDA protocol when erroneous SDA signaling is detected. In this way, a memory device may spend less time in an erroneous SDA-enabled state, thereby limiting the likelihood of unintended operation of the memory device.

In aspects, erroneous SDA detection may be configured or tracked using registers. For example, the controller of the memory device may use an SDA flag register to indicate whether unintended SDA signaling has been detected. In some implementations, the memory controller may enable various protocols or functionalities of the erroneous SDA detection through register writes. For example, the automatic exit protocol or the erroneous SDA detection protocol as a whole may be enabled or disabled through register writes. Additionally or alternatively, configurations of the erroneous SDA detection protocol may be altered through registers. Specifically, a time register may store a value that defines the maximum allowable passage of time between an MRW command that enables the SDA protocol and an MPC that determines one or more of the memory dice to mask. In this way, the current configuration of the erroneous SDA detection may be controlled by the memory controller, and indications of the current configuration may be stored for reference. In some implementations, the registers may be implemented internal to or external from the memory device.

As described above, erroneous SDA detection may enable signaling that conflicts with the SDA protocol to be identified and responded to. In some cases, erroneous SDA detection may be particularly advantageous in applications that involve high-density memory, for example, those that relate to the CXL standard. In general, however, erroneous SDA detection may reduce the likelihood of a memory device erroneously masking memory dice, thereby limiting the memory device from exhibiting unexpected, and in some cases, dangerous behavior.

Example Operating Environments

FIG. 1 illustrates an example operating environment including an apparatus 102 that can implement erroneous SDA detection. The apparatus 102 can include various types of electronic devices, including an internet-of-things (IoT) device 102-1, tablet device 102-2, smartphone 102-3, notebook computer 102-4, passenger vehicle 102-5, server computer 102-6, server cluster 102-7 that may be part of a cloud computing infrastructure, and data center or portion thereof (e.g., a PCB). Other examples of the apparatus 102 include a wearable device (e.g., a smartwatch or intelligent glasses), entertainment device (e.g., a set-top box, video dongle, smart television, a gaming device), desktop computer, motherboard, server blade, consumer appliance, vehicle, drone, industrial equipment, security device, sensor, or the electronic components thereof. Each type of apparatus can include one or more components to provide computing functionalities or features.

In example implementations, the apparatus 102 can include at least one host device 104, at least one interconnect 106, and at least one memory device 108. The host device 104 can include at least one processor 110, at least one cache memory 112, and a memory controller 114. The memory device 108, which can also be realized with a memory module, can include, for example, a dynamic random-access memory (DRAM) die or module (e.g., Low-Power Double Data Rate synchronous DRAM (LPDDR SDRAM)). The DRAM die or module can include a three-dimensional (3D) stacked DRAM device, which may be a high-bandwidth memory (HBM) device or a hybrid memory cube (HMC) device. The memory device 108 can operate as a main memory for the apparatus 102. Although not illustrated, the apparatus 102 can also include storage memory. The storage memory can include, for example, a storage-class memory device (e.g., a flash memory, hard disk drive, solid-state drive, phase-change memory (PCM), or memory employing 3D XPoint™).

The processor 110 is operatively coupled to the cache memory 112, which is operatively coupled to the memory controller 114. The processor 110 is also coupled, directly or indirectly, to the memory controller 114. The host device 104 may include other components to form, for instance, a system-on-a-chip (SoC). The processor 110 may include a general-purpose processor, central processing unit (CPU), graphics processing unit (GPU), neural network engine or accelerator, application-specific integrated circuit (ASIC), field-programmable gate array (FPGA) integrated circuit (IC), or communications processor (e.g., a modem or baseband processor).

In operation, the memory controller 114 can provide a high-level or logical interface between the processor 110 and at least one memory (e.g., an external memory). The memory controller 114 may be realized with any of a variety of suitable memory controllers (e.g., a DDR memory controller that can process requests for data stored on the memory device 108). Although not shown, the host device 104 may include a physical interface (PHY) that transfers data between the memory controller 114 and the memory device 108 through the interconnect 106. For example, the physical interface may be an interface that is compatible with a DDR PHY Interface (DFI) Group interface protocol. The memory controller 114 can, for example, receive memory requests from the processor 110 and provide the memory requests to external memory with appropriate formatting, timing, and reordering. The memory controller 114 can also forward to the processor 110 responses to the memory requests received from external memory.

The host device 104 is operatively coupled, via the interconnect 106, to the memory device 108. In some examples, the memory device 108 is connected to the host device 104 via the interconnect 106 with an intervening buffer or cache. The memory device 108 may operatively couple to storage memory (not shown). The host device 104 can also be coupled, directly or indirectly via the interconnect 106, to the memory device 108 and the storage memory. The interconnect 106 and other interconnects (not illustrated in FIG. 1) can transfer data between two or more components of the apparatus 102. Examples of the interconnect 106 include a bus, switching fabric, or one or more wires that carry voltage or current signals.

In some implementations, the interconnect 106 can include at least one command and address bus 122 (CA bus 122) and at least one data bus 124 (DQ bus 124). Each bus may be a unidirectional or a bidirectional bus. The CA bus 122 and the DQ bus 124 may couple to CA and DQ pins, respectively, of the memory device 108. The interconnect 106 may also include a chip-select (CS) I/O or line (not illustrated in FIG. 1) that can, for example, couple to one or more CS pins of the memory device 108. The interconnect 106 may further include a clock bus (CK bus— not illustrated in FIG. 1) that is part of or separate from the CA bus 122.

In other implementations, the interconnect 106 can be realized as a CXL link. In other words, the interconnect 106 can comport with at least one CXL standard or protocol. The CXL link can provide an interface on top of the physical layer and electricals of a PCIe 5.0 physical layer. The CXL link can cause requests to and responses from the memory device 108 to be packaged as flits. An example implementation of the apparatus 102 with a CXL link is discussed in greater detail with respect to FIG. 4. In still other implementations, the interconnect 106 can be another type of link, including a PCIe 5.0 link. In this document, some terminology may draw from one or more of these standards or versions thereof, like the CXL standard, for clarity. The described principles, however, are also applicable to memories and systems that comport with other standards and types of interconnects.

The illustrated components of the apparatus 102 represent an example architecture with a hierarchical memory system. A hierarchical memory system may include memories at different levels, with each level having memory with a different speed or capacity. As illustrated, the cache memory 112 logically couples the processor 110 to the memory device 108. In the illustrated implementation, the cache memory 112 is at a higher level than the memory device 108.

A storage memory, in turn, can be at a lower level than the main memory (e.g., the memory device 108). Memory at lower hierarchical levels may have a decreased speed but increased capacity relative to memory at higher hierarchical levels.

The apparatus 102 can be implemented in various manners with more, fewer, or different components. For example, the host device 104 may include multiple cache memories (e.g., including multiple levels of cache memory) or no cache memory. In other implementations, the host device 104 may omit the processor 110 or the memory controller 114. A memory (e.g., the memory device 108) may have an "internal" or "local" cache memory. As another example, the apparatus 102 may include cache memory between the interconnect 106 and the memory device 108. Computer engineers can also include any of the illustrated components in distributed or shared memory systems.

Computer engineers may implement the host device 104 and the various memories in multiple manners. In some cases, the host device 104 and the memory device 108 can be disposed on, or physically supported by, a PCB (e.g., a rigid or flexible motherboard). The host device 104 and the memory device 108 may additionally be integrated together on an IC or fabricated on separate ICs and packaged together. The memory device 108 may also be coupled to multiple host devices 104 via one or more interconnects 106 and may respond to memory requests from two or more host devices 104. Each host device 104 may include a respective memory controller 114, or the multiple host devices 104 may share a memory controller 114. This document describes with reference to FIG. 2 an example computing system architecture having at least one host device 104 coupled to a memory device 108.

Two or more memory components (e.g., modules, dies, banks, or bank groups) can share the electrical paths or couplings of the interconnect 106. In some implementations, the CA bus 122 transmits addresses and commands from the memory controller 114 of the host device 104 to the memory device 108, which may exclude propagation of data. In some implementations, the memory device 108 may include multiple memory dice that couple to a common CA bus 122. The DQ bus 124 can propagate data between the memory controller 114 and the memory device 108. Like the CA bus 122, the DQ bus 124 may propagate data between multiple memory dice through a common DQ bus. The memory device 108 may also be implemented as any suitable memory including, but not limited to, DRAM, SDRAM, three-dimensional (3D) stacked DRAM, DDR memory, or LPDDR memory (e.g., LPDDR DRAM or LPDDR SDRAM).

The memory device 108 can form at least part of the main memory of the apparatus 102. The memory device 108 may, however, form at least part of a cache memory, a storage memory, or an SoC of the apparatus 102. In some implementations, and as discussed in greater detail with respect to FIG. 2, an SDA controller 116 can also be incorporated into the memory device 108 at any functional position. In aspects, the SDA controller 116 may be coupled to the host device 104 either directly or indirectly through the interconnect 106.

As illustrated in FIG. 1, the memory device 108 can include the SDA controller 116. The SDA controller 116 may include logic to internally control or monitor the SDA protocol, as performed on the memory 118. For example, the SDA controller 116 may include control logic that can enable and disable the SDA protocol and monitor commands associated with the SDA protocol that are received at the memory device 108. The SDA controller 116 may be configured to monitor signaling indicative of commands associated with the SDA protocol to determine if the SDA protocol has been erroneously enabled or if a signal associated with the SDA protocol is received in a fashion that is atypical. The SDA controller 116 or another part of the memory device 108 may maintain one or more registers to track the SDA protocol or the erroneous SDA detection, as it pertains to the memory 118.

The memory controller 114 can transmit commands to the memory device 108 (e.g., through the SDA controller 116), including a command that causes the memory device 108 to enable or disable the SDA protocol. When the command to enable the SDA protocol (e.g., an MRW command) is transmitted, the memory device 108 or a portion of the memory 118 may enable selective access to multiple memory dice that couple to a CA bus. The memory controller 114 may then transmit signaling indicative of a command to mask one or more of the memory dice coupled to the common CA bus (e.g., an MPC) to enable select access to only the unmasked dice. In response, the SDA controller 116 may mask the select dice within the memory 118 to allow select access in accordance with the SDA protocol.

If, however, the SDA controller 116 determines that the signaling associated with the SDA protocol (e.g., the MRW command and the MPC) was received erroneously, the SDA controller 116 may store an indication of the erroneous SDA signaling, and in some cases, respond to disable the SDA protocol on the memory device 108 or the portion of the memory device 108. In doing so, the SDA controller 116, or the erroneous SDA detection generally, may reduce the likelihood that the memory device 108 may erroneously mask memory dice or perform other operations associated with the SDA protocol.

Figure 2:
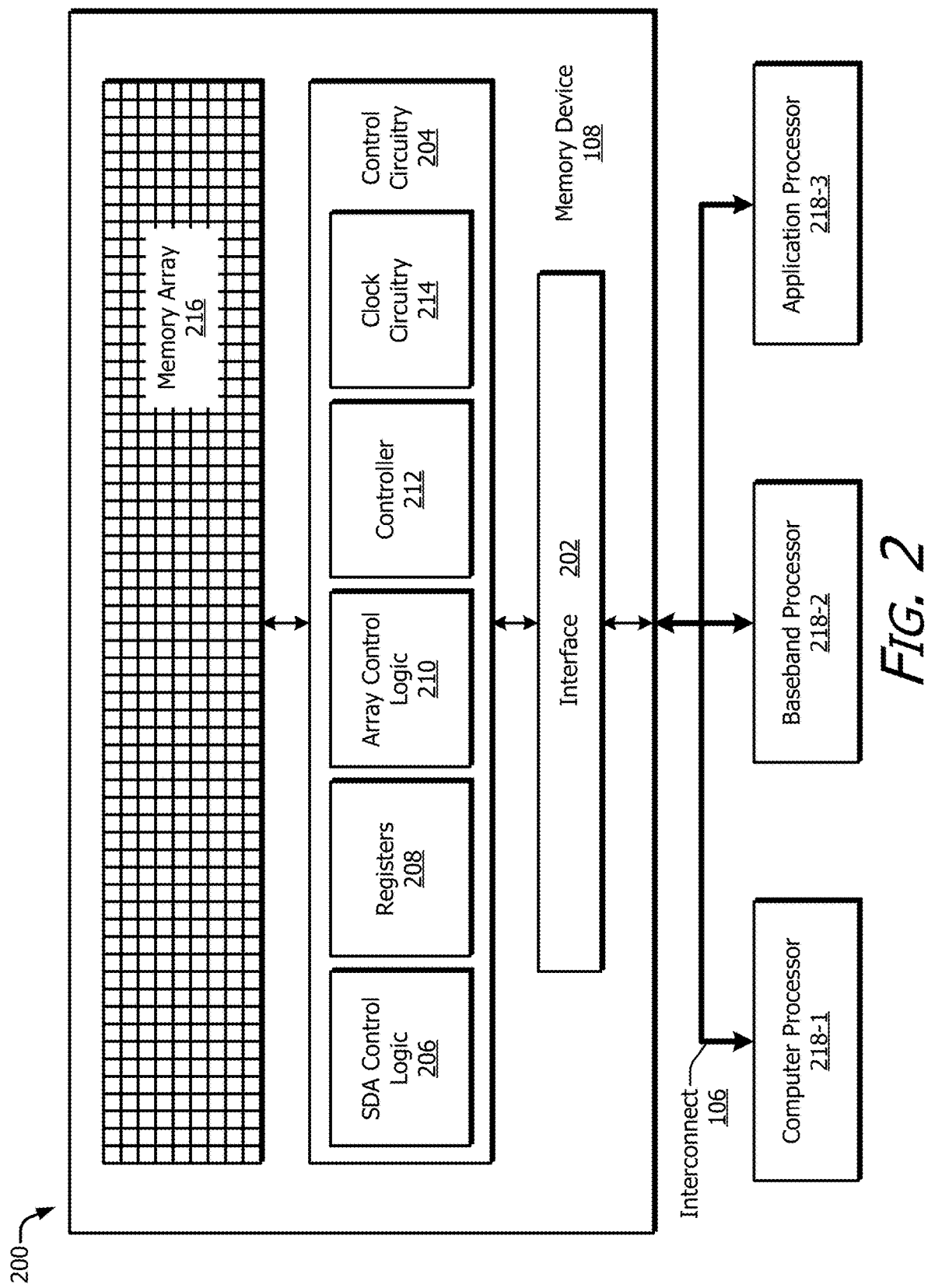
FIG. 2 illustrates an example computing system that can implement one or more aspects of erroneous SDA detection.

FIG. 2 illustrates an example computing system 200 that can implement aspects of erroneous SDA detection. In some implementations, the computing system 200 includes at least one memory device 108, at least one interconnect 106, and at least one processor 218. In this implementation, SDA control logic 206 (e.g., which can include the SDA controller 116 of FIG. 1) is included in the memory device 108.

The memory device 108 can include, or be associated with, at least one memory array 216, at least one interface 202, and control circuitry 204 operatively coupled to the memory array 216. The memory device 108 can correspond to one or more of the cache memory, the main memory, or a storage memory of the apparatus 102 of FIG. 1. Thus, the memory array 216 can include an array of memory cells, including but not limited to memory cells of DRAM, SDRAM, 3D-stacked DRAM, DDR memory, low-power DRAM, or LPDDR SDRAM. For example, the memory array 216 can include memory cells of SDRAM configured as a memory module with one channel containing either 16 or 8 data (DQ) signals, double-data-rate input/output (I/O) signaling, and supporting a supply voltage of 0.3 to 0.5V. The density of the memory device 108 can range, for instance, from 2 Gb to 32 Gb. The memory array 216 and the control circuitry 204 may be components on a single semiconductor die or on separate semiconductor dies. The memory array 216 or the control circuitry 204 may also be distributed across multiple dies.

The control circuitry 204 can include various components that the memory device 108 can use to perform various operations. These operations can include communicating with other devices, managing memory performance, performing refresh operations, performing masking operations (e.g., in accordance with the SDA protocol), and performing memory read or write operations. For example, the control circuitry 204 can include SDA control logic 206, one or more registers 208, at least one instance of array control logic 210, a controller 212, and clock circuitry 214. The SDA control logic 206 may be implemented as circuitry that enables the memory array 216 to perform operations in accordance with the SDA protocol. The registers 208 may be implemented, for example, as one or more registers (e.g., an SDA flag register, SDA mode register, or any other register utilized by the SDA protocol) that can store information to be used by the control circuitry 204 or another part of the memory device 108. The array control logic 210 can include circuitry that provides command decoding, address decoding, input/output functions, amplification circuitry, power supply management, power control modes, and other functions. The clock circuitry 214 can synchronize various memory components with one or more external clock signals provided over the interconnect 106, including a command/address clock or a data clock. The clock circuitry 214 can also use an internal clock signal to synchronize memory components and may provide timing functionality to the SDA control logic 206.

The SDA control logic 206 may enable select access to multiple memory dice of the memory device 108 in accordance with the SDA protocol. For example, the SDA control logic 206 may alter a mode register of the registers 208 that enables the SDA protocol in response to an MRW command. In response to an MPC, the SDA control logic 206 may implement a masking operation that masks a proper subset of memory dice that couple to a common CA bus. In doing so, the remaining memory dice that couple to the common CA bus may receive and respond to commands carried on the CA bus, while the masked memory dice do not respond to the commands. In this way, memory dice may be accessed selectively, even when a group of memory dice shares a common CA bus.

In general, the SDA control logic 206 may also enable erroneous SDA detection. For example, the SDA control logic 206 may monitor when the memory device 108 or a portion of the memory array 216 enables the SDA protocol (e.g., the SDA protocol is enabled). The SDA control logic 206 may utilize the clock circuitry 214 to determine if a command that causes the memory device 108 to mask one or more memory dice is received within a predetermined time period. In particular, the SDA control logic 206 may monitor the passage of time between an MRW command and a subsequent MPC. If an MPC is not received before a passage of the predetermined period of time, the SDA control logic 206 may store an indication that the SDA protocol was entered erroneously within the registers 208.

In another example, the SDA control logic 206 may determine that a command to mask one or more memory dice (e.g., the MPC) of the memory device 108 is received prior to the reception of a command to enable the SDA protocol (e.g., the MRW command). As a result, the SDA control logic 206 may determine that the MPC command was erroneously received and store an indication of the erroneous SDA detection within the registers 208. While various examples are provided, in general, the SDA control logic 206 may monitor the signaling received across the interface 202 to determine if signaling associated with the SDA protocol is received erroneously.

The interface 202 can couple the control circuitry 204 or the memory array 216 directly or indirectly to the interconnect 106. As shown in FIG. 2, the SDA control logic 206, the registers 208, the array control logic 210, the controller 212, and the clock circuitry 214 can be part of a single component (e.g., the control circuitry 204). In other implementations, one or more of the refresh control logic 206, the registers 208, the array control logic 210, the controller 212, or the clock circuitry 214 may be separate components on a single semiconductor die or distributed across multiple semiconductor dies. These components may individually or jointly couple to the interconnect 106 via the interface 202.

The interconnect 106 may use one or more of a variety of interconnects that communicatively couple together various components and enable commands, addresses, or other information and data to be transferred between two or more components (e.g., between the memory device 108 and the processor 218). Although the interconnect 106 is illustrated with a single line in FIG. 2, the interconnect 106 may include at least one bus, at least one switching fabric, one or more wires or traces that carry voltage or current signals, at least one switch, one or more buffers, and so forth. Further, the interconnect 106 may be separated into at least a CA bus 122 and a DQ bus 124 (as illustrated in FIG. 1). As discussed above with respect to FIG. 1, the interconnect 106 can include a CXL link or comport with at least one CXL standard and at least one common CA bus may couple to multiple memory dice. The CXL link can provide an interface or overlay on top of the physical layer and electricals of the PCIe 5.0 physical layer.

In some aspects, the memory device 108 may be a "separate" component relative to the host device 104 (of FIG. 1) or any of the processors 218. The separate components can include a PCB, memory card, memory stick, or memory module (e.g., a single in-line memory module (SIMM) or dual in-line memory module (DIMM)). Thus, separate physical components may be located together within the same housing of an electronic device or may be distributed over a server rack, a data center, and so forth. Alternatively, the memory device 108 may be integrated with other physical components, including the host device 104 or the processor 218, by being combined on a PCB or in a single package or an SoC.

The described apparatuses and methods may be appropriate for memory designed for lower-power operations or energy-efficient applications. An example of a memory standard related to low-power applications is the LPDDR standard for SDRAM as promulgated by the Joint Electron Device Engineering Council (JEDEC) Solid State Technology Association. In this document, some terminology may draw from one or more of these standards or versions thereof, like the LPDDR5 standard, for clarity. The described principles, however, are also applicable to memories that comport with other standards, including other LPDDR standards (e.g., earlier versions or future versions like LPDDR6) and to memories that do not adhere to a standard.

As shown in FIG. 2, the processors 218 may include a computer processor 218-1, a baseband processor 218-2, and an application processor 218-3, coupled to the memory device 108 through the interconnect 106. The processors 218 may include or form a part of a CPU, GPU, SoC, ASIC, or FPGA. In some cases, a single processor can comprise multiple processing resources, each dedicated to different functions (e.g., modem management, applications, graphics, central processing). In some implementations, the baseband processor 218-2 may include or be coupled to a modem (not illustrated in FIG. 2) and referred to as a modem processor. The modem or the baseband processor 218-2 may be coupled wirelessly to a network via, for example, cellular, Wi-Fi®, Bluetooth®, near field, or another technology or protocol for wireless communication.

In some implementations, the processors 218 may be connected directly to the memory device 108 (e.g., via the interconnect 106). In other implementations, one or more of the processors 218 may be indirectly connected to the memory device 108 (e.g., over a network connection or through one or more other devices). Further, the processor 218 may be realized as one that can communicate over a CXL-compatible interconnect. Accordingly, a respective processor 218 can include or be associated with a respective link controller, like the link controller 428 illustrated in FIG. 4. Alternatively, two or more processors 218 may access the memory device 108 using a shared link controller 428. In some of such cases, the memory device 108 may be implemented as a CXL-compatible memory device (e.g., as a CXL Type 3 memory expander) or another memory device that is compatible with a CXL protocol may also or instead be coupled to the interconnect 106.

Example Techniques and Hardware

Figure 3:
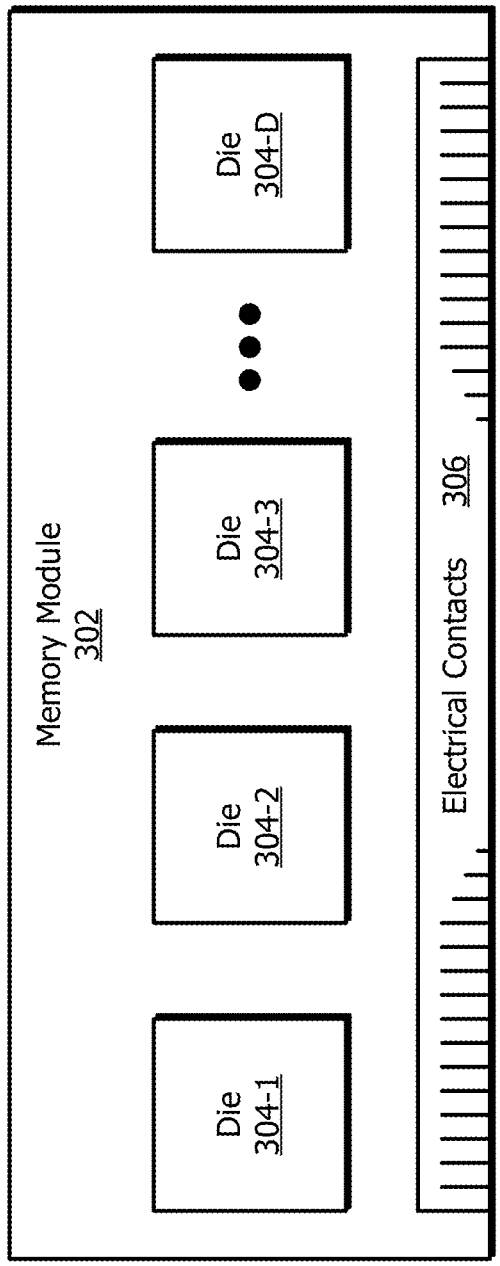
FIG. 3 illustrates an example memory device in which erroneous SDA detection may be implemented.

FIG. 3 illustrates an example memory device. An example memory module 302 includes multiple dice 304. As illustrated, the memory module 302 includes a first die 304-1, a second die 304-2, a third die 304-3, and a Dth die 304-D, with "D" representing a positive integer. As a few examples, the memory module 302 can be a SIMM or a DIMM. As another example, the memory module 302 can interface with other components via a bus interconnect (e.g., a Peripheral Component Interconnect Express (PCIe®) bus). The memory device 108 illustrated in FIGS. 1 and 2 can correspond, for example, to multiple dies (or dice) 304-1 through 304-D or a memory module 302 with one or more dice 304. As shown, the memory module 302 can include one or more electrical contacts 306 (e.g., pins) to interface the memory module 302 to other components.

The memory module 302 can be implemented in various manners. For example, the memory module 302 may include a PCB, and the multiple dice 304-1 through 304-D may be mounted or otherwise attached to the PCB. The dice 304 (e.g., memory dice) may be arranged in a line or along two or more dimensions (e.g., forming a grid or array). The dice 304 may have a similar size or may have different sizes. Each die 304 may be similar to another die 304 or different in size, shape, data capacity, or control circuitries. The dice 304 may also be positioned on a single side or on multiple sides of the memory module 302. In some cases, the memory module 302 may be part of a CXL memory system or module.

In aspects, the dice 304 may be implemented such that multiple dice couple to a single CA bus. For example, the dice 304 may be configured such that each CA bus couples to four memory dice. In some implementations, the CA bus may communicate signals to a first die of the four memory dice that is linked, either directly or indirectly, to the other three memory dice. The four memory dice that couple to a common CA bus may communicate data along multiple shared DQ buses. For example, a first memory die and a second memory die of the four memory dice may couple to a first DQ bus, and the third memory die and the fourth memory die may couple to a second DQ bus. In this way, the memory module 302 may be implemented as a high-density memory module, which may be required for various standards, such as the LPDDR5 standard or the CXL standard.

Figure 4:
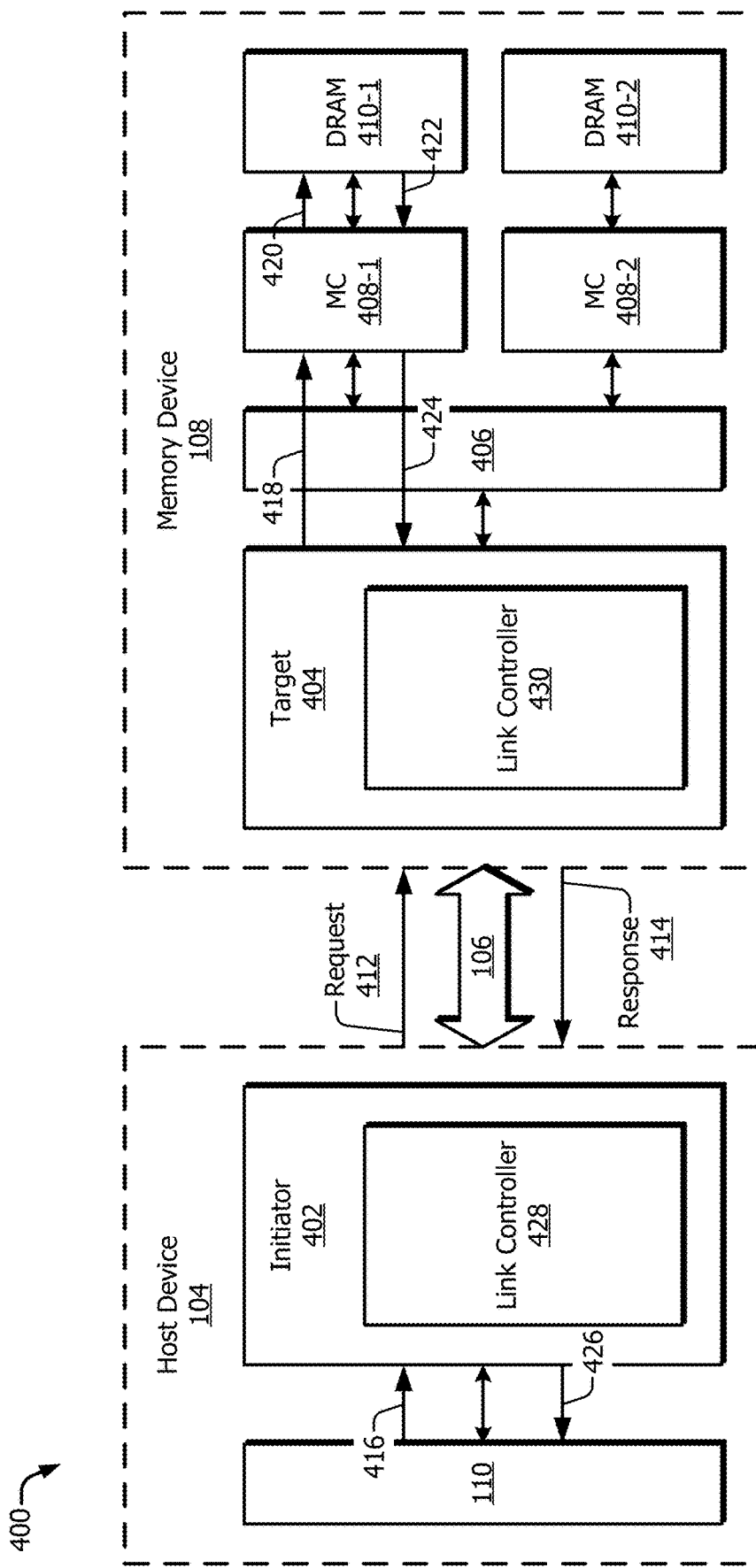
FIG. 4 illustrates an example of a system that includes a host device and a memory device coupled together via an interconnect in which erroneous SDA detection may be implemented with the memory device.

FIG. 4 illustrates an example of a system 400 that includes a host device 104 and a memory device 108 that are coupled together via an interconnect 106. The system 400 may form at least part of an apparatus 102 as shown in FIG. 1. As illustrated, the host device 104 includes a processor 110 and a link controller 428, which can be realized with at least one initiator 402. Thus, the initiator 402 can be coupled to the processor 110 or to the interconnect 106 (including to both), and the initiator 402 can be coupled between the processor 110 and the interconnect 106. Examples of initiators 402 may include a leader, a primary, a master, a main component, and so forth.

In the illustrated example system 400, the memory device 108 includes a link controller 430, which may be realized with at least one target 404. The target 404 can be coupled to the interconnect 106. Thus, the target 404 and the initiator 402 can be coupled to each other via the interconnect 106. Examples of targets 404 may include a follower, a secondary, a slave, a responding component, and so forth. The memory device 108 also includes a memory, which may be realized with at least one memory module or other component, such as a DRAM 410, as is described further below.

In example implementations, the initiator 402 includes the link controller 428, and the target 404 includes the link controller 430. The link controller 428 or the link controller 430 can instigate, coordinate, cause, or otherwise control signaling across a physical or logical link realized by the interconnect 106 in accordance with one or more protocols. The link controller 428 may be coupled to the interconnect 106. The link controller 430 may also be coupled to the interconnect 106. Thus, the link controller 428 can be coupled to the link controller 430 via the interconnect 106. Each link controller 428 or 430 may, for instance, control communications over the interconnect 106 at a link layer or at one or more other layers of a given protocol. Communication signaling may include, for example, a request 412 (e.g., a write request or a read request), a response 414 (e.g., a write response or a read response), and so forth.

The memory device 108 may further include at least one interconnect 406 and at least one memory controller 408 (e.g., MC 408-1 and MC 408-2). Within the memory device 108, and relative to the target 404, the interconnect 406, the memory controller 408, or the DRAM 410 (or other memory component) may be referred to as a "backend" component of the memory device 108. In some cases, the interconnect 406 is internal to the memory device 108 and may operate in a manner the same as or different from the interconnect 106.

As shown, the memory device 108 may include multiple memory controllers 408-1 and 408-2 or multiple DRAMs 410-1 and 410-2. Although two each are shown, the memory device 108 may include one or more memory controllers or one or more DRAMs. For example, a memory device 108 may include four memory controllers and 16 DRAMs, such as four DRAMs per memory controller. The memory components of the memory device 108 are depicted as DRAM only as an example, for one or more of the memory components may be implemented as another type of memory. For instance, the memory components may include nonvolatile memory like flash or PCM. Alternatively, the memory components may include other types of volatile memory like static random-access memory (SRAM). A memory device 108 may also include any combination of memory types.

In some cases, the memory device 108 may include the target 404, the interconnect 406, the at least one memory controller 408, and the at least one DRAM 410 within a single housing or other enclosure. The enclosure, however, may be omitted or may be merged with an enclosure for the host device 104, the system 400, or an apparatus 102 (of FIG. 1). The interconnect 406 can be disposed on a PCB. Each of the target 404, the memory controller 408, and the DRAM 410 may be fabricated on at least one IC and packaged together or separately. The packaged ICs may be secured to or otherwise supported by the PCB and may be directly or indirectly coupled to the interconnect 406. In other cases, the target 404, the interconnect 406, and the one or more memory controllers 408 may be integrated together into one IC. In some of such cases, this IC may be coupled to a PCB, and one or more modules for the memory components (e.g., for the DRAM 410) may also be coupled to the same PCB, which can form a CXL type of memory device 108. This memory device 108 may be enclosed within a housing or may include such a housing. The components of the memory device 108 may, however, be fabricated, packaged, combined, and/or housed in other manners.

As illustrated in FIG. 4, the target 404, including the link controller 430 thereof, can be coupled to the interconnect 406. Each memory controller 408 of the multiple memory controllers 408-1 and 408-2 can also be coupled to the interconnect 406. Accordingly, the target 404 and each memory controller 408 of the multiple memory controllers 408-1 and 408-2 can communicate with each other via the interconnect 406. Each memory controller 408 is coupled to at least one DRAM 410. As shown, each respective memory controller 408 of the multiple memory controllers 408-1 and 408-2 is coupled to at least one respective DRAM 410 of the multiple DRAMs 410-1 and 410-2. Each memory controller 408 of the multiple memory controllers 408-1 and 408-2 may, however, be coupled to a respective set of multiple DRAMs 410 (e.g., five DRAMs 410) or other memory components. As shown by way of example with respect to the DRAM 410-2, each DRAM 410 may include at least one SDA controller 116 or at least one memory 118 (e.g., also of FIG. 1), including at least one instance of both such components.

Each memory controller 408 can access at least one DRAM 410 by implementing one or more memory access protocols to facilitate reading or writing data based on at least one memory address. The memory controller 408 can increase bandwidth or reduce latency for the memory accessing based on the memory type or organization of the memory components, like the DRAMs 410. The multiple memory controllers 408-1 and 408-2 and the multiple DRAMs 410-1 and 410-2 can be organized in many different manners. For example, each memory controller 408 can realize one or more memory channels for accessing the DRAMs 410. Further, the DRAMs 410 can be manufactured to include one or more ranks, such as a single-rank or a dual-rank memory module. Each DRAM 410 (e.g., at least one DRAM IC chip) may also include multiple banks, such as 8 or 16 banks.

This document now describes examples of the host device 104 accessing the memory device 108. The examples are described in terms of a general access which may include a memory read access (e.g., a retrieval operation) or a memory write access (e.g., a storage operation). The processor 110 can provide a memory access request 416 to the initiator 402. The memory access request 416 may be propagated over a bus or other interconnect that is internal to the host device 104. This memory access request 416 may be or may include a read request or a write request. The initiator 402, such as the link controller 428 thereof, can reformulate the memory access request into a format that is suitable for the interconnect 106. This formulation may be performed based on a physical protocol or a logical protocol (including both) applicable to the interconnect 106. Examples of such protocols are described below.

The initiator 402 can thus prepare a request 412 and transmit the request 412 over the interconnect 106 to the target 404. The target 404 receives the request 412 from the initiator 402 via the interconnect 106. The target 404, including the link controller 430 thereof, can process the request 412 to determine (e.g., extract or decode) the memory access request. Based on the determined memory access request, the target 404 can forward a memory request 418 over the interconnect 406 to a memory controller 408, which is the first memory controller 408-1 in this example. For other memory accesses, the targeted data may be accessed with the second DRAM 410-2 through the second memory controller 408-2.

The first memory controller 408-1 can prepare a memory command 420 based on the memory request 418. The first memory controller 408-1 can provide the memory command 420 to the first DRAM 410-1 over an interface or interconnect appropriate for the type of DRAM or other memory component. The first DRAM 410-1 receives the memory command 420 from the first memory controller 408-1 and can perform the corresponding memory operation. The memory command 420, and corresponding memory operation, may pertain to a read operation, a write operation, a refresh operation, and so forth. Based on the results of the memory operation, the first DRAM 410-1 can generate a memory response 422. If the memory request 412 is for a read operation, the memory response 422 can include the requested data. If the memory request 412 is for a write operation, the memory response 422 can include an acknowledgment that the write operation was performed successfully. The first DRAM 410-1 can return the memory response 422 to the first memory controller 408-1.

The first memory controller 408-1 receives the memory response 422 from the first DRAM 410-1. Based on the memory response 422, the first memory controller 408-1 can prepare a memory response 424 and transmit the memory response 424 to the target 404 via the interconnect 406. The target 404 receives the memory response 424 from the first memory controller 408-1 via the interconnect 406. Based on this memory response 424, and responsive to the corresponding request 412, the target 404 can formulate a response 414 for the requested memory operation. The response 414 can include read data or a write acknowledgment and be formulated in accordance with one or more protocols of the interconnect 106.

To respond to the memory request 412 from the host device 104, the target 404 can transmit the response 414 to the initiator 402 over the interconnect 106. Thus, the initiator 402 receives the response 414 from the target 404 via the interconnect 106. The initiator 402 can therefore respond to the "originating" memory access request 416, which is from the processor 110 in this example. To do so, the initiator 402 prepares a memory access response 426 using the information from the response 414 and provides the memory access response 426 to the processor 110. In this way, the host device 104 can obtain memory access services from the memory device 108 using the interconnect 106. Example aspects of an interconnect 106 are described next.

The interconnect 106 can be implemented in a myriad of manners to enable memory-related communications to be exchanged between the initiator 402 and the target 404. Generally, the interconnect 106 can carry memory-related information, such as data or a memory address, between the initiator 402 and the target 404. In some cases, the initiator 402 or the target 404 (including both) can prepare memory-related information for communication across the interconnect 106 by encapsulating such information. The memory-related information can be encapsulated into, for example, at least one packet (e.g., a flit). One or more packets may include headers with information indicating or describing the content of each packet.

In example implementations, the interconnect 106 can support, enforce, or enable memory coherency for a shared memory system, for a cache memory, for combinations thereof, and so forth. Additionally or alternatively, the interconnect 106 can be operated based on a credit allocation system. Possession of a credit can enable an entity, such as the initiator 402, to transmit another memory request 412 to the target 404. The target 404 may return credits to "refill" a credit balance at the initiator 402. A credit-based communication scheme across the interconnect 106 may be implemented by credit logic of the target 404 or by credit logic of the initiator 402 (including by both working together in tandem). Examples of erroneous SDA detection are described herein with reference to at least one memory controller 408 and at least one DRAM 410, including an SDA controller thereof. Example aspects of the memory controller 408, the SDA controller, and the DRAM 410 are described below with reference to FIGS. 5 through 10. Additionally or alternatively, the memory controller 114 (of FIG. 1) may also guide or support SDA operations or the erroneous SDA detection of the DRAMs 410 or the dice 304 (of FIG. 3).

The system 400, the initiator 402 of the host device 104, or the target 404 of the memory device 108 may operate or interface with the interconnect 106 in accordance with one or more physical or logical protocols. For example, the interconnect 106 may be built in accordance with a Peripheral Component Interconnect Express (PCIe or PCI-e) standard. Applicable versions of the PCIe standard may include 1.x, 2.x, 3.x, 4.0, 5.0, 6.0, and future or alternative versions. In some cases, at least one other standard is layered over the physical-oriented PCIe standard. For example, the initiator 402 or the target 404 can communicate over the interconnect 106 in accordance with a CXL standard. Applicable versions of the CXL standard may include 1.x, 2.0, and future or alternative versions. The CXL standard may operate based on credits, such as read credits and write credits. In such implementations, the link controller 428 and the link controller 430 can be CXL controllers.

Figure 5:
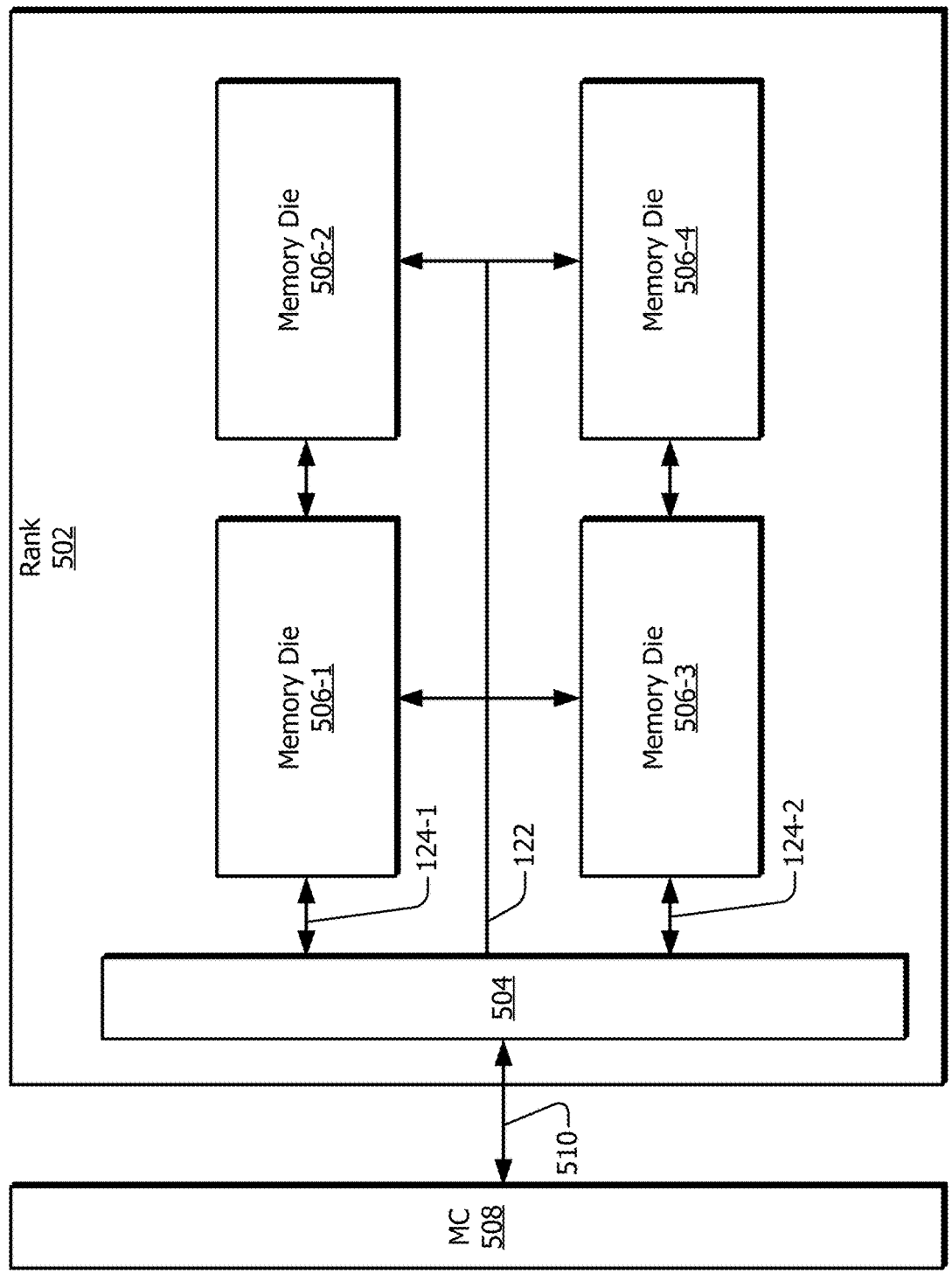
FIG. 5 illustrates an example memory rank configuration of a memory device including multiple memory dice and a memory controller.

FIG. 5 illustrates an example memory rank 502 that can implement one or more aspects of erroneous SDA detection. As illustrated, the memory rank 502 includes memory dice 506, which may be implemented as part of a memory device (e.g., the memory device 108 of FIG. 1, 2, or 4 and/or including at least a portion of the memory module 302 of FIG. 3). The memory device may include any number of memory dice, as described with respect to FIG. 3. As illustrated, the memory dice 506 can be coupled to a memory controller 508 via an interconnect 510 (e.g., an example of the interconnect 106 of FIG. 1) using an interface 504. The memory controller 508 can correspond to the host-side memory controller 114 (of FIG. 1) or to the memory-side memory controller 408 (of FIG. 4). The memory controller 508 may initiate or control operations of the memory dice 506, such as those associated with the SDA protocol.

In aspects, the interconnect 510 or the interface 504 may implement at least one CA bus 122 and at least one DQ bus 124. The memory dice 506 may couple to a common CA bus 122 that transmits signaling (e.g., indicative of commands and addresses) from the memory controller 508 to the memory dice 506, or vice versa. As illustrated, the memory dice 506 are implemented as high-density memory (e.g., as may be required by LPDDR5 standard), and thus each of the memory die may not include an individual CA pin connected to the CA bus 122. Instead, the CA bus 122 may couple to a memory die 506-1 that is linked to the remaining memory dice 506. As illustrated, the memory die 506-1 is linked to the memory die 506-2, which links to the memory die 506-4, and that memory die 506-4 links to the memory die 506-3. As all of the memory dice 506 are linked to the same CA bus, each of the memory dice 506 may receive the same signaling across the CA bus 122. As such, the memory dice 506 may generally be accessed as a group, except when implementing protocols that enable individual or select access (e.g., the SDA protocol).

Although a specific implementation of the linked memory dice 506 are shown, it should be appreciated that other implementations are possible without extending beyond the scope of this disclosure. For example, each of the remaining memory dice 506 (e.g., memory die 506-2, memory die 506-3, and memory die 506-4) may link directly to the memory die 506-1, or any other memory die coupled to the common CA bus. Other implementations exist where each memory rank is composed of multiple CA buses that couple to subsets of memory dice within the memory rank.

As described in FIG. 1, the interconnect 510 or the interface 504 may implement at least one DQ bus 124 (e.g., DQ bus 124-1 and DQ bus 124-2) to communicate data between the memory controller and the memory dice 506. In general, a DQ bus 124 may be shared between the memory dice 506. As illustrated, the rank 502 is implemented with two DQ buses (e.g., DQ bus 124-1 and DQ bus 124-2). Specifically, DQ bus 124-1 couples to memory die 506-1 and memory die 506-2 (e.g., either directly or indirectly through memory die 506-1), and DQ bus 124-2 couples to memory die 506-3 and memory die 506-4 (e.g., either directly or indirectly through memory die 506-3). In aspects, the DQ bus 124 may transfer data to or from the coupled memory dice 506, for example, DQ bus 124-1 transfers data to/from the memory die 506-1 and the memory die 506-2, and DQ bus 124-2 transfers data to/from the memory die 506-3 and the memory die 506-4.

Although specific implementations have been illustrated and described with respect to FIG. 5, any other combination is considered and reasonable. For example, each of the memory dice 506 could couple to a different DQ bus and to a common CA bus. Each of the memory dice 506 may couple to a common DQ bus and a common CA bus. As such, any configuration of the memory rank 502 could be used to perform the erroneous SDA detection described herein.

Figures 1, 6:
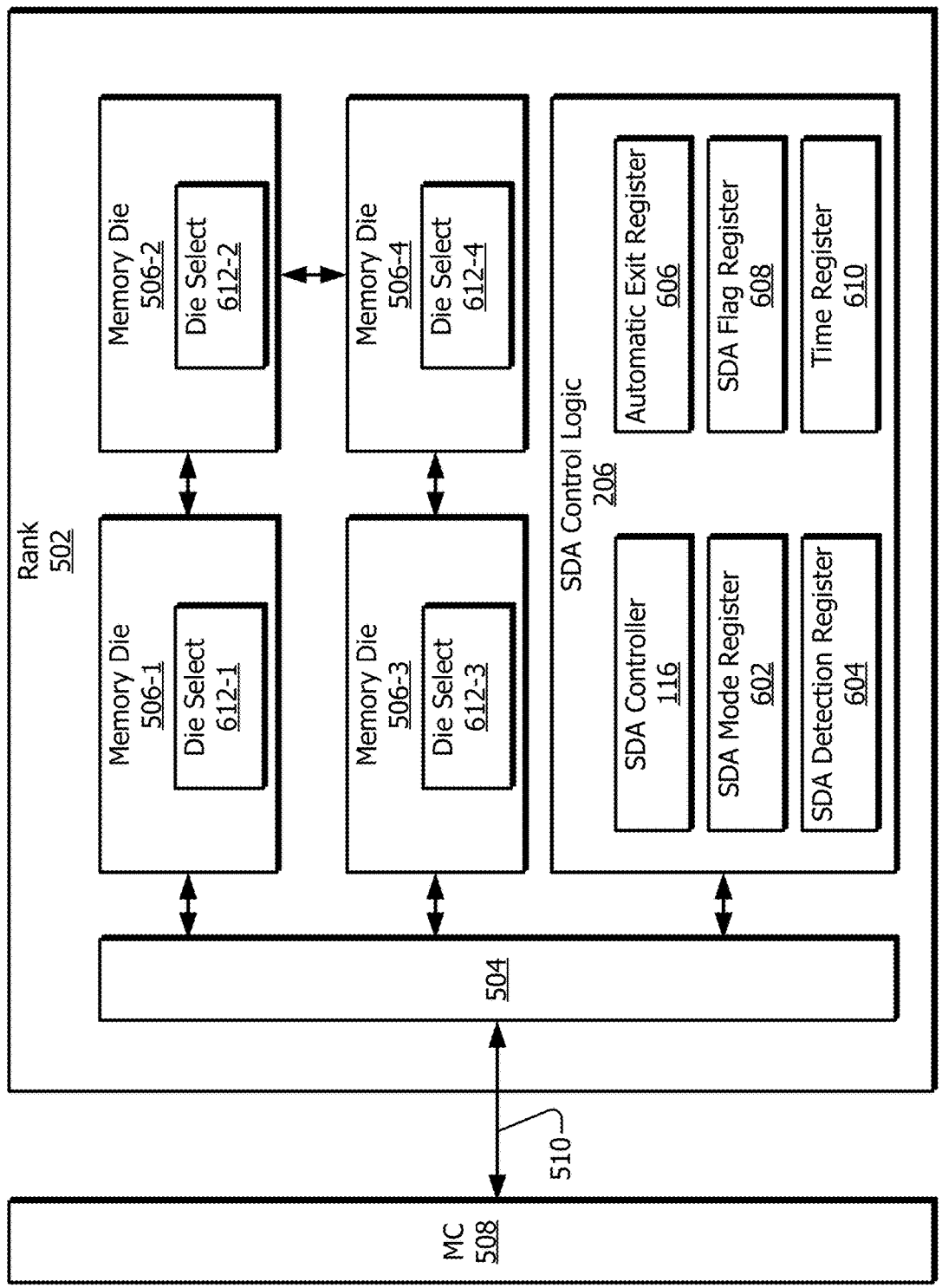
Figures 2, 6:
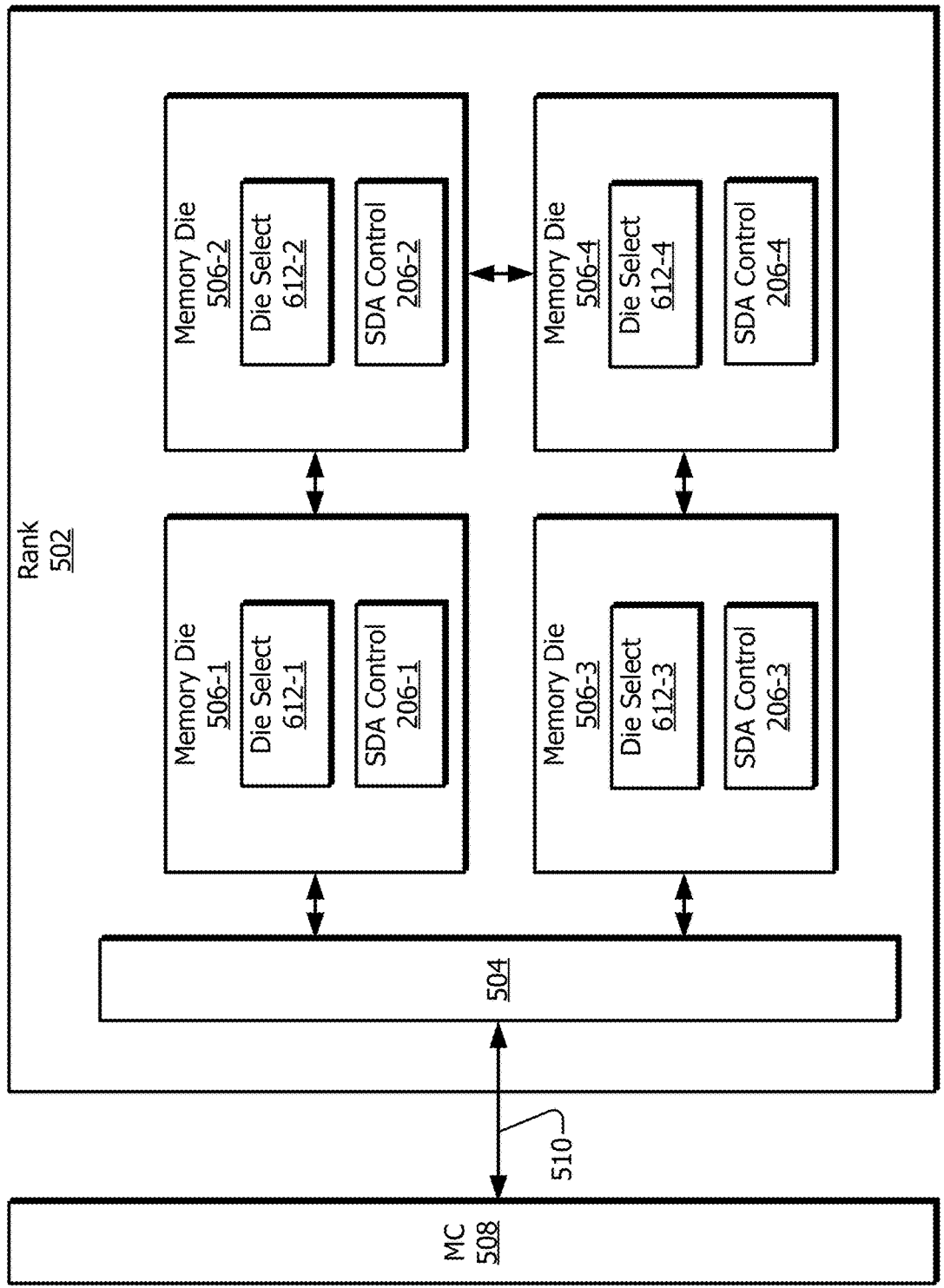

FIG. 6-1 illustrates an example memory rank 502 of a memory device including control logic 206 that can implement one or more aspects of erroneous SDA detection. The SDA control logic 206 may enable operations associated with the SDA protocol or erroneous SDA detection. In the depicted example, the SDA control logic 206 includes the SDA controller 116, at least one SDA mode register 602, at least one SDA detection register 604, at least one automatic exit register 606, at least one unintended SDA flag register 608, and at least one time register 610.

The SDA control logic 206 may communicate with the memory controller 508 or the memory dice 506 through the interconnect 510 or the interface 504. Although illustrated as including four memory dice (memory die 506-1, memory die 506-2, memory die 506-3, and memory die 506-4), the memory rank 502 may include any number of memory dice 506. The memory dice 506 may couple to at least one CA bus and at least one DQ bus, as described in greater detail above with respect to FIG. 5. The memory dice 506 may receive control signaling from the memory controller 508 or the SDA control logic 206.

The SDA control logic 206 may implement or operate in accordance with the SDA protocol, for example, by enabling select die access to the memory dice 506 through select masking of the memory dice 506. Additionally, the SDA control logic 206 may enable erroneous SDA detection within the memory dice 506. In aspects, the memory controller 508 may enable or disable the SDA protocol using the SDA mode register 602. For example, the memory controller 508 may transmit signaling to the SDA controller 116 to write a first value to SDA mode register 602 that is indicative of an enabled state of the SDA protocol (e.g., a one). In aspects, the signaling may include an MRW command that enables the memory dice 506 to be masked. In general, the SDA protocol may be enabled when select die access is beneficial (e.g., PPR, trim by die, and trim per byte). When the SDA protocol is no longer needed, the memory controller 508 may transmit a signal to instruct the SDA controller 116 to disable the SDA protocol (e.g., an MRW command) that writes a second value to the SDA mode register (e.g., a zero) that is indicative of a disabled state of the SDA protocol.

Like the SDA protocol, erroneous SDA detection may be enabled or disabled, for example, through the SDA detection register 604. For example, erroneous SDA detection may be enabled or disabled by memory controller 508 through transmission of a control signal to the SDA controller 116 to write to the SDA detection register 604 a first value (e.g., a one) to enable erroneous SDA detection or a second value (e.g., a zero) to disable erroneous SDA detection. In some implementations, erroneous SDA detection may be enabled upon start-up of the memory device. Alternatively, erroneous SDA detection may be disabled unless specifically enabled through signaling from the memory controller 508.

In addition to enabling and disabling the erroneous SDA detection, the memory controller 508 may transmit signals to configure various parameters of erroneous SDA detection. For example, the SDA control logic 206 may implement an automatic exit protocol that disables the SDA protocol (e.g., by changing the value stored in the SDA mode register 602) in response to a determination that signaling associated with the SDA protocol was received erroneously or erroneously. In aspects, this determination may be based on receiving an MPC to mask select memory dice when the SDA protocol is not enabled (e.g., the MRW command has not been issued). In another aspect, conflicting signaling may be detected based on the memory device receiving an MRW command that enables the SDA protocol that is not followed by an MPC that selects the memory dice to mask. In either case, the SDA controller 116, may raise a flag (e.g., store a value indicative of the determination in the SDA flag register 608) when the memory device is determined to erroneously receive signaling associated with the SDA protocol. In other examples, the flag may be transmitted as signaling directly to the memory controller 508. Generally, the conflicting signaling may be indicated through signaling or through values stored in any of the registers.

The memory controller 508 may transmit requests (e.g., to the SDA controller 116 or any other controller of the memory device) to read the value stored in the SDA flag register 608. In aspects, the memory controller 508 may transmit these read requests at least once every set quantity of time. As such, the memory controller 508 may monitor if signaling that conflicts with the SDA protocol is detected by the memory device. If the memory controller 508 reads a value from the SDA flag register 608 that indicates that signaling associated with the SDA protocol is uncharacteristic (e.g., conflicting), the memory controller 508 may initiate an error handling process of the memory device. For example, the memory controller 508 may initiate a reset of the memory device, a power cycle of the memory dice 506, or store an indication of the error in an error log.

To configure the erroneous SDA detection, the memory controller 508 may transmit signals that configure parameters of this conflicting signaling determination. For example, the time register 610 may store a quantity of predetermined time options that may define the maximum allowable time between the reception of the MRW command and the MPC (e.g., between enabling the SDA protocol and receiving a command to mask a select subset of dice). If the MPC command is not received within the predetermined period of time, the SDA controller 116 may determine that signaling associated with the SDA protocol has been received in an unusual fashion (e.g., unintentional or erroneous signaling). The memory controller 508 may configure the parameters of this determination, for example, by transmitting signaling indicative of one of the predetermined options to the SDA controller 116. The SDA controller 116 may store an indication of the selected predetermined time period in the time register 610

As a specific example, the time register 610 may store four predetermined time periods (e.g., 100 microseconds, 500 microseconds, 2 milliseconds, and 10 milliseconds). In general, the predetermined time periods may be between 100 microseconds and 10 milliseconds. Each option may be identified by a set of bit representations (e.g., 00, 01, 10, and 11). The memory controller 508 may send signaling indicative of the bit representation to the SDA controller 116, and the SDA controller 116 may store an indication of the selected option in the time register 610. Although a specific example is provided, the predetermined time options may differ from those described. Specifically, the predetermined time options may include a different number of options than those shown, different bit representations for the time options, or different quantities of time as the predetermined options.

Although shown as within the SDA control logic 206, any of the registers may be implemented elsewhere in the memory device or external to the memory device. Further, any of the registers shown may be combined or separated into a single register or different registers, respectively. The registers may include more or less registers than those shown, including other registers not shown in FIG. 6-1.

In aspects, the SDA controller 116 may control operations associated with the SDA protocol and operations associated with erroneous SDA detection. As such, the SDA controller 116 may couple to the memory dice 506 through the interface 504. In a specific implementation, the memory controller 508 may transmit an MRW command to the SDA controller 116, which enables the SDA protocol on the memory dice 506. The memory controller 508 may then transmit an MPC that selects individual memory die to mask. In aspects, the SDA controller 116 may mask the selected dice through the die select 612 associated with each memory die (e.g., die select 612-1 of memory die 506-1, die select 612-2 of memory die 506-2, die select 612-3 of memory die 506-3, and die select 612-4 of memory die 506-4). By masking the selected dice, the remaining subset of dice that do not include the selected dice may be able to receive and respond to signaling across the CA bus, while the selected, masked die are unable to receive or perform commands in response to the signaling transmitted along the CA bus.

In addition to intentional operations associated with the SDA protocol, the SDA controller 116 may control the memory dice 506 as appropriate based on erroneous SDA detection. For example, when the automatic exit protocol is enabled and the SDA controller 116 determines that signaling that conflicts with the SDA protocol has been detected, the automatic exit protocol may cause the memory dice 506 to unmask all the memory dice 506 to ensure that no memory die remains erroneously masked as a result of the erroneous enablement of the SDA protocol. In this way, erroneous SDA detection may prevent unintentional masking of the memory dice, thus reducing the likelihood of the memory device to perform unexpectedly or improperly. While the automatic exit protocol may disable the SDA protocol, in some instances, the automatic exit protocol may not clear the flag stored in the unintended SDA flag register 608. In general, the unintended SDA flag may remain raised until the memory device is reset, the memory rank 502 or the memory dice 506 undergoes a power cycle, erroneous SDA detection is disabled, or an MRW command to enable the SDA protocol is received.

Although the SDA controller 116 is described as controlling the SDA protocol and erroneous SDA detection on the memory device, the SDA controller 116 may be implemented as multiple controllers that each handle a single one of these tasks or portions of the tasks. The SDA controller 116, or the SDA control logic 206 generally, may receive commands from the memory controller 508 and communicate with the memory dice 506 in any number of ways. As such, the SDA controller 116 or the SDA control logic 206 may be located in a number of locations within the memory device. For example, the SDA controller 116 or the SDA control logic 206 may be an intermediary between the memory controller 508 and the memory dice 506. In this case, each command transmitted from the memory controller 508 to the memory dice 506 may pass through the SDA control logic 206. As another example, the SDA controller 116 or the SDA control logic 206 may be located adjacent to the memory dice 506 and simply monitor commands across the interconnect 510 or the interface 504. In other implementations, portions of the SDA control logic 206 or portions of the SDA controller 116 may be located in multiple locations, for example, the ones described above.

As a specific example of the various configurations of the SDA control logic 206, FIG. 6-2 illustrates an example memory rank 502 of a memory device including SDA control logic 206 (e.g., control logic 206-1, control logic 206-2, control logic 206-3, and control logic 206-4) implemented within the multiple memory dice 506. As shown, the control logic 206 may be implemented, at least in part, within the multiple memory dice 506. In this way, each memory die of the memory dice 506 may include its own SDA control logic 206. While shown in FIG. 6-2 as implemented completely within the memory dice 506, portions of the SDA control logic 206 may still be implemented outside the memory dice 506, for example, any of the registers or the controller described in FIG. 6-1 may be implemented outside the memory dice 506. Therefore, it should be appreciated that though two specific examples of the memory rank 502 are shown in FIGS. 6-1 and 6-2, other configurations are possible and to be understood as falling within the scope of this document.

Example Methods

This section describes example methods with reference to the flow charts of FIGS. 7 through 10 for implementing erroneous SDA detections. These descriptions may also refer to components, entities, and other aspects depicted in FIGS. 1 through 6, which reference is made only by way of example. In aspects, the following example methods can be at least partially performed by the SDA controller 116 or the memory controller 114 or the memory controller 408 (in this section referred to generally as the memory controller 508). In other implementations, the example methods can be implemented at different functional places in the memory-access chain (e.g., at another controller in the host device 104 or the memory device 108).

Figure 7:
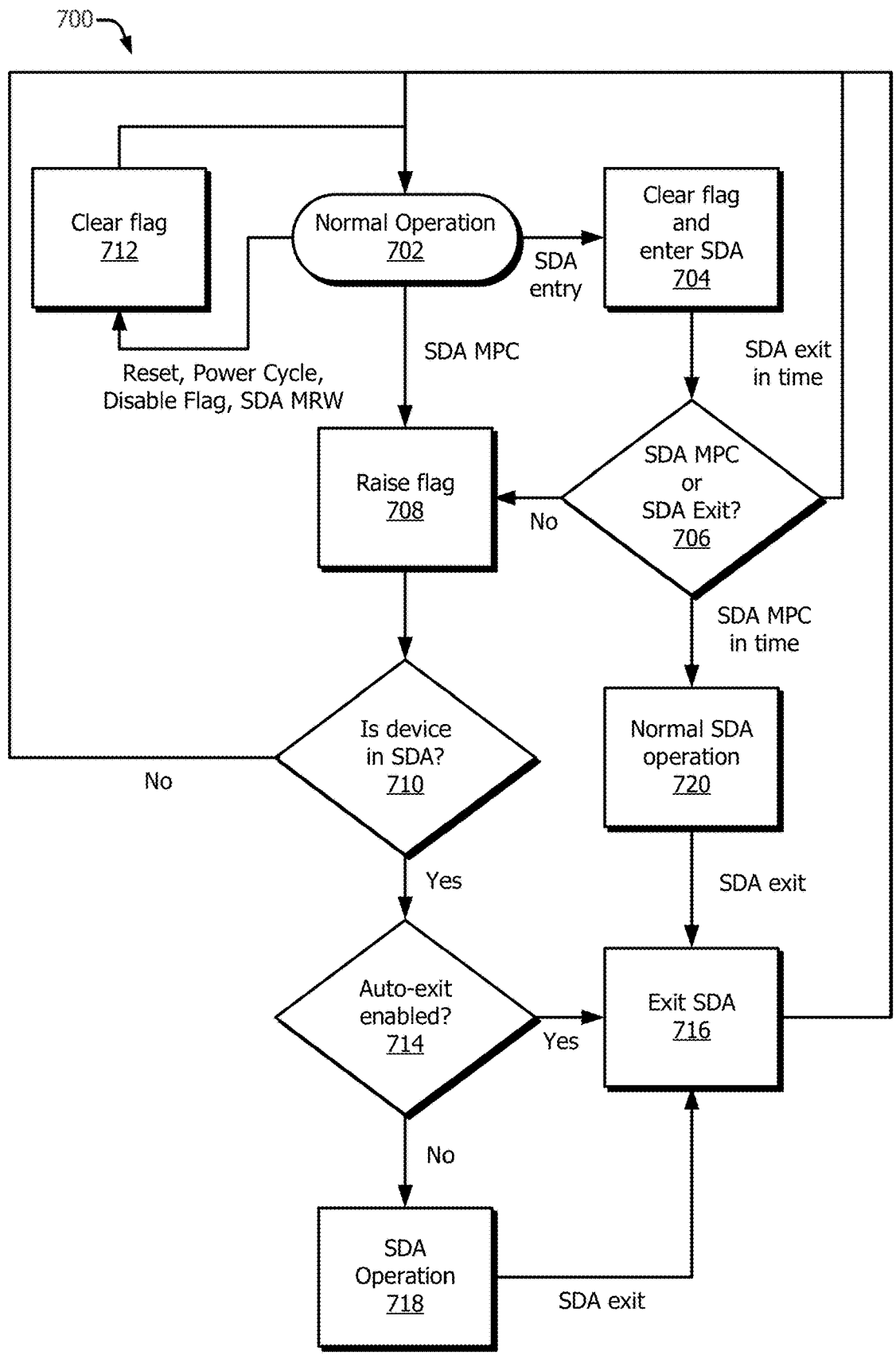
FIG. 7 illustrates an example flow diagram for implementing one or more aspects of erroneous SDA detection.

FIG. 7 illustrates an example flow diagram 700 for implementing one or more aspects of erroneous SDA detection. The example flow diagram 700 begins at 702 with a memory device 108 in normal operation (e.g., the SDA protocol is not enabled). At 704, the flow diagram continues after the SDA protocol receives a command to enter (e.g., enable) the SDA protocol. In aspects, the SDA protocol may be enabled through an MRW command transmitted by the memory controller 508 that instructs the SDA controller 116 to write a value indicative of the enabled SDA protocol to the SDA mode register 602. When the SDA protocol is enabled, the SDA flag may be cleared (e.g., the value is rewritten to a value that does not indicate the unintended signaling has been detected) from the SDA flag register 608.

The flow diagram 700 then continues at 706 where a determination is made as to whether the memory device 108 receives an MPC (e.g., a command to mask one or more select memory dice) or an SDA exit (e.g., disabling the SDA protocol) before the passage of the predetermined period of time, as indicated by the time register 610 and defined by the memory controller 508. In general, when the SDA protocol is intentionally enabled, an MPC command is expected within a "short" period of time (e.g., in contrast to a "long" period of time defined by the predetermined period of time) from the MRW command. As such, if the SDA controller 116 determines that the memory device 108 has not received an MPC after the passage of a "long" period of time after the reception of the MRW command, the SDA controller 116 may determine that signaling that conflicts with the SDA protocol was detected, and the process may continue at 708 where the SDA flag is raised.

In aspects, the SDA flag is raised by the SDA controller 116 by storing a value that is indicative of the erroneous reception of signaling that is associated with the SDA protocol within the SDA flag register 608. In some implementations, the SDA controller 116 may send a signal indicative of the SDA flag to the memory controller 508 to notify the memory controller 508 that unusual signaling associated with the SDA protocol has been received. As such, the memory controller 508 may respond by initiating an error handling process associated with the memory device 108. In other implementations, the memory controller 508 may transmit read requests to the SDA controller 116 to monitor if signaling that conflicts with the SDA protocol has been detected (e.g., received) by the memory device 108. Similarly, if the memory controller 508 determines, based on the value read from the SDA flag register 608, that signaling is detected that conflicts with the SDA protocol, the memory controller 508 may begin performing an error handling process.

Alternatively, or in addition to raising a flag, the automatic exit protocol may enable the SDA controller to disable the SDA protocol in response to the determination that signaling that conflicts with the SDA protocol has been detected at the memory device 108. For example, at 710 the SDA controller 116 may determine if the memory device 108 or the relevant memory dice 506 have the SDA protocol enabled. If the SDA protocol is not enabled, the flow diagram 700 may continue back to normal operation at 702 with the SDA flag raised until the flag is cleared at 712 (e.g., by resetting the memory device 108, power cycling the memory dice 506, disabling erroneous SDA detection though the SDA detection register 604, or by enabling the SDA protocol again through the MRW command). In aspects, the flag may be cleared as part of the error handling process or in response to the initiation or completion of the error handling process. In other examples, the flag may be cleared when the SDA protocol is disabled.

If the device is determined to be in the SDA protocol (e.g., the SDA protocol is enabled), the SDA controller 116 may determine if the automatic exit protocol is enabled at 714. In some instances, the automatic exit protocol is enabled through signaling transmitted from the memory controller 508 to the memory device 108 that causes the SDA controller 116 to write a value to the automatic exit register 606. When the automatic exit protocol is enabled, the SDA controller 116 may automatically disable the SDA protocol at 716, thereby limiting the chance that one or more memory dice 506 are erroneously masked while the memory device 108 is erroneously in the SDA protocol. In some implementations, the automatic exit protocol may include the SDA controller 116 issuing a command to unmask all memory dice 506 to ensure that no memory dice 506 remain erroneously masked as a result of the erroneous reception of signaling associated with the SDA protocol.

If the automatic exit protocol is disabled, the flow diagram 700 may continue at 718 where the memory device 108 or the memory dice 506 remain in the SDA protocol (e.g., the SDA protocol remains enabled). In aspects, keeping the SDA protocol enabled may be dangerous because memory dice 506 may be erroneously masked by an inadvertent MPC and thus, cause the memory device to perform unexpectedly, and in some cases, dangerously. In general, if the automatic exit protocol is disabled, the SDA protocol may be enabled until an MRW command is issued to disable the SDA protocol, for example, as a result of the memory controller 508 issuing the MRW command as a portion of an error handling process.

Following back to the decision at 706, if an SDA exit (e.g., an MRW command to disable the SDA protocol) is received before the passage of the predetermined period of time, the memory device 108 may continue normal operation 702. In aspects, an SDA exit (e.g., disabling the SDA protocol) may include unmasking all of the memory dice 506 or at least the memory dice that were masked, intentionally or unintentionally, while the SDA protocol was enabled.

If an MPC is issued before the predetermined period of time has elapsed, however, the memory device may continue operation in accordance with the SDA mode at 720. For example, the SDA controller 116 may mask one or more of the memory dice 506 based on the MPC and the remaining, unmasked memory dice may perform operations in response to commands transmitted across the common CA bus 122. The unmasked memory dice may receive or provide information along the DQ bus 124 or DQ buses. The memory device 108 may continue this operation until the memory device 108 or the memory dice 506 exit the SDA protocol at 716, for example, in response to an MRW command from the memory controller 508 that instructs the SDA controller 166 to disable the SDA protocol. The memory device 108 may then return to normal operation at 702.

Figure 8:
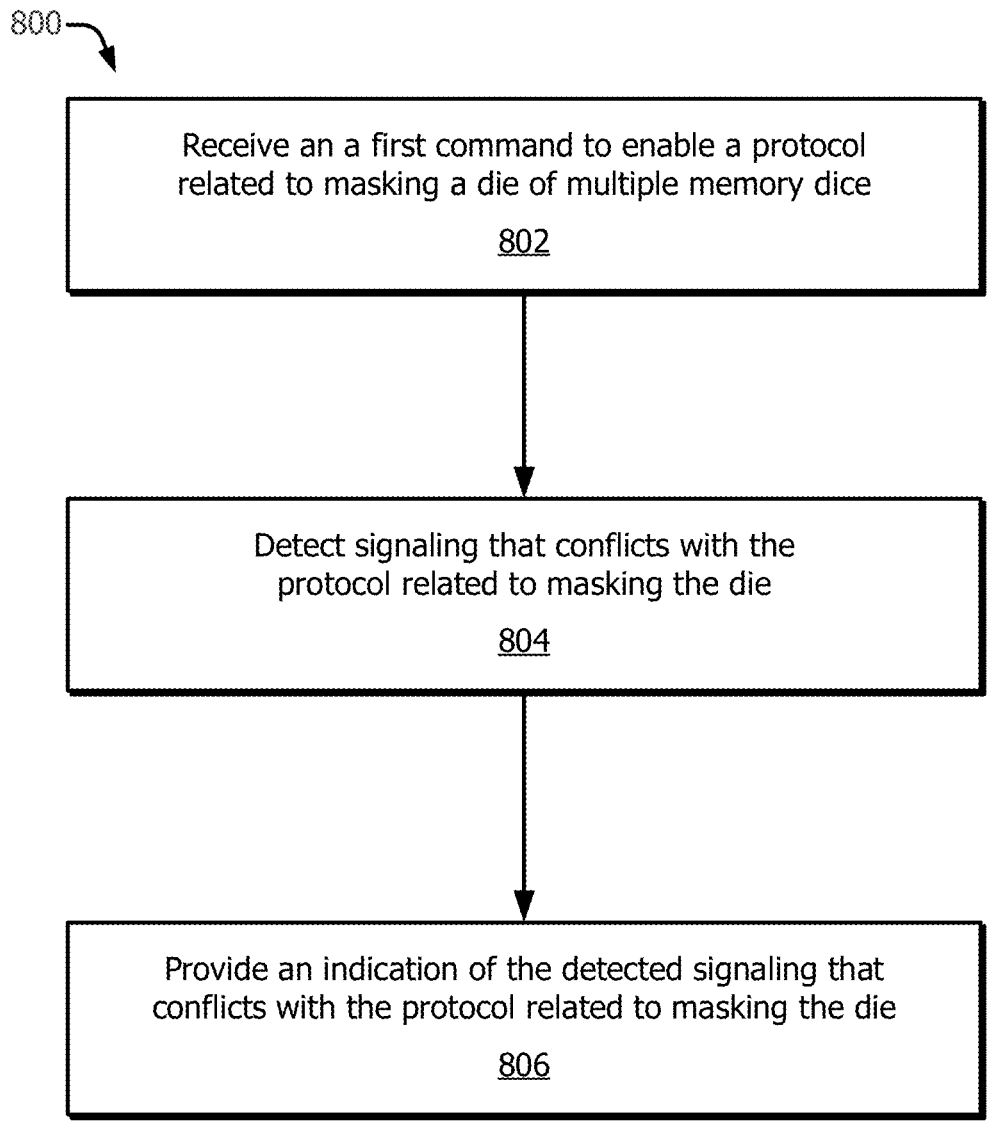
FIG. 8 illustrates an example method performed by a memory device for implementing erroneous SDA detection.

FIG. 8 illustrates an example method 800 performed by a memory device 108 for implementing erroneous SDA detection. The method 800 may illustrate various examples of how to detect and respond to erroneous SDA signaling. At 802, the SDA controller 116, the SDA control logic 206, or the memory device 108 generally, may receive a first command (e.g., an MRW command) to enter (e.g., enable) a protocol related to masking a die of multiple memory die (e.g., the SDA protocol). In response to the first command, the SDA controller 116 may write a value indicative of an enabled state into the SDA mode register 602. As a result, the memory dice 506 may implement selective access and masking in accordance with the SDA protocol.

At 804, the SDA controller 116, the SDA control logic 206, or the memory device 108 generally detects signaling that conflicts with the SDA protocol. In aspects, the determination may be based on the memory device 108 not receiving signaling indicative of a second command (e.g., an MPC) that selects one or more of the memory dice 506 to mask within a maximum allowable time period after the reception of the first command. In this case, the maximum allowable time may be chosen from a predetermined period of time, which may be defined by a selection of one or more options stored within the time register 610. For example, the memory controller 508 may transmit signaling to the memory device 108 that is indicative of a selection of an option for the predetermined time period that is stored within the time register 610. In aspects, the SDA controller 116 may store an indication of the selection in the predetermined time period. As a result, the memory controller 508 may define the predetermined time period that is used to determine that signaling that conflicts with the SDA protocol is detected.

At 806, the SDA controller 116 provides an indication of the detected signaling that conflicts with the SDA protocol. In aspects, this may include storing a value in a register or transmitting signaling indicative of the detected signaling. Specifically, the SDA flag may be stored within the SDA flag register 608. If an automatic exit protocol is enabled on the memory device 108 (e.g., the automatic exit register 606 stores a value indicative of an enabled state), the SDA controller 116 may exit the SDA protocol (e.g., by disabling the SDA protocol through a register write to the SDA mode register 602). In aspects, exiting or disabling the SDA protocol may include unmasking any of the memory dice 506 that were accidentally masked while the SDA protocol was enabled. In general, the unintended SDA flag may remain raised even when the automatic exit protocol is enabled and the SDA protocol is automatically exited to enable the memory controller 508 to perform an error handling process or acknowledge the erroneous SDA detection. By performing the method 800 for erroneous SDA detection in accordance with any of the described implementations, however, the memory device 108 may be protected against erroneous masking of the memory dice 506.

FIG. 9 illustrates an example method 900 performed by a memory device 108 for implementing erroneous SDA detection. Similar to the method 800 of FIG. 8, the method 900 may illustrate examples of detecting and responding to erroneous SDA signaling. In general, the method 900 may be performed by the SDA controller 116, the SDA control logic 206, or the memory device 108 generally.

At 902, a second command (e.g. an MPC) is received by the memory device 108 that instructs the SDA controller 116 to mask a select subset of the memory dice 506. In this case, the second command is received prior to the first command (e.g., an MRW command) that enables the SDA mode. In some examples, the MPC may be used for multiple purposes. In some examples, the MPC causes the memory device 108 to perform different operations when the SDA protocol is enabled versus when the SDA protocol is disabled. In other examples, the MPC may cause the memory device 108 to perform different operations within a single state of the SDA protocol (e.g., enabled or disabled). In yet another example, the MPC may be similar to other commands (e.g., different by a few bits), and the MPC may be received when bit errors propagate in these signals. In any case, the SDA controller 116 may determine that receiving the MPC prior to the MRW command is uncharacteristic and thus, signaling that conflicts with the SDA protocol is detected.

At 904, the SDA controller 116 detects signaling that conflicts with the SDA protocol. In aspects, this determination may be based on the reception of the MPC prior to the reception of the MRW command that enables the SDA protocol.

At 906, the SDA controller 116 provides an indication of the detected signaling that conflicts with the SDA protocol. As an example, the SDA controller 116 may raise the SDA flag by storing a value indicative of the detected signaling that conflicts with the SDA protocol within the SDA flag register 608. In some implementations, the SDA controller 116 may transmit signaling indicative of the SDA signaling to the memory controller 508 to notify the memory controller 508 of the erroneous SDA detection. Like the method 800 of FIG. 8, the method 900 may reduce the likelihood of a memory device 108 performing unpredictably or dangerously as a result of erroneous memory die masking.

FIG. 10 illustrates an example method 1000 performed by a memory controller 508 for implementing erroneous SDA detection. In aspects, the method 1000 may be performed by the memory controller 114, the memory controller 408, or the memory controller 508. While describing the method 1000, the memory controller 508 may be used to refer generally to the memory controller 114 or the memory controller 408. In general, the method 1000 may describe examples of the memory controller 508 controlling or utilizing erroneous SDA detection with respect to the memory device 108.

At 1002, the memory controller 508 may transmit signaling indicative of a first command to enable an erroneous SDA detection. For example, the memory controller 508 may transmit a first command (e.g., an MRW command) that instructs the SDA controller 116 to write a value indicative of an enabled state to the SDA detection register 604. In this way, the SDA controller 116 may be able to perform operations associated with erroneous SDA detection. Specifically, the SDA controller 116 may detect signaling that conflicts with the SDA protocol, for example, signaling received in an uncharacteristic manner at the memory device 108. If the SDA controller 116 detects signaling that conflicts with the SDA protocol, the SDA controller 116 may store an indication of the detected signaling in the SDA flag register 608.

In addition to enabling and disabling erroneous SDA detection, the memory controller 508 may configure parameters of the erroneous SDA detection. For example, the memory controller 508 may transmit signaling to the memory device 108 that causes the SDA controller 116 to define the predetermined time period. In aspects, the predetermined time period is used to define a maximum allowable time period between the reception of the MRW command to enable the SDA protocol and the MPC to select one or more memory dice 506 to mask. As such, the memory controller 508 may control parameters for determining that the memory device 108 has erroneously received signaling associated with the SDA protocol. In another aspect, the memory controller 508 may enable an automatic exit protocol on the memory device 108. For example, the memory controller 508 may transmit signaling indicative of a command to cause the SDA controller 116 to write a value indicative of an enabled state in the automatic exit register 606. In this way, the memory controller 508 may enable the SDA controller 116 to automatically exit or disable the SDA protocol in response to the detection of signaling that conflicts with the SDA protocol.

At 1004, the memory controller 508 may transmit signaling indicative of a request to read a value from the SDA flag register 608. For example, the memory controller 508 may transmit a read request to the memory device 108 that causes the SDA controller 116 to return the value stored in the SDA flag register 608. To ensure that erroneous SDA detection is consistently monitored, the memory controller 508 may transmit read requests at least once every set quantity of time. In some implementations, the SDA flag register 608 may be reset (e.g., write a value that is not indicative of the determination that SDA signaling has been erroneously received) when the value stored in the SDA flag register 608 is transmitted to the memory controller 508. In other implementations, the SDA flag register 608 may only be reset after an SDA protocol exit (e.g., disabling the SDA protocol), a reset of the memory device 108, a power cycle of the memory dice 506, a command to disable erroneous SDA detection, or an MRW command to enable the SDA protocol.

At 1006, the memory controller 508 receives signaling indicative of the value stored within the SDA flag register 608. For example, the memory controller 508 may determine, based on the signaling, whether conflicting signaling has been detected at the memory device 108. If the memory controller 508 determines that conflicting signaling has not been detected, the memory device 108 or the memory controller 508 may continue to function normally. However, if the memory controller 508 determines that conflicting signaling has been detected, the memory controller 508 or the memory device 108 may perform an error handling process.

At 1008, the memory controller 508 performs an error handling process. In aspects, the error handling process may include logging (e.g., storing) an indication of the error (e.g., the erroneous SDA detection) in a memory. In this way, the memory controller 508 may track the erroneous SDA detection to ensure proper operation of the memory device 108. In some implementations, the error handling process may include a reset of the memory device 108, a power cycle of the memory dice 506, or a command to disable erroneous SDA detection. In doing so, the memory controller 508 may prevent any future inconsistent or dangerous behavior by the memory device 108 due to erroneous memory die masking, thereby increasing the security and reliability of the memory device 108.

For the example flow diagram and methods described above, the orders in which operations are shown and/or described are not intended to be construed as a limitation. Any number or combination of the described operations can be combined or rearranged in any order to implement a given method or an alternative method. Operations may also be omitted from or added to the described methods. Further, described operations can be implemented in fully or partially overlapping manners.

Aspects of these methods may be implemented in, for example, hardware (e.g., fixed-logic circuitry or a processor in conjunction with a memory), firmware, software, or some combination thereof. The methods may be realized using one or more of the apparatuses or components shown in FIGS. 1 through 6, the components of which may be further divided, combined, rearranged, and so on. The devices and components of these figures generally represent hardware, such as electronic devices, packaged modules, IC chips, or circuits; firmware or the actions thereof; software; or a combination thereof. Thus, these figures illustrate some of the many possible systems or apparatuses capable of implementing the described methods.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

Conclusion

Although this document describes implementations for erroneous SDA detection in language specific to certain features or methods, the subject of the appended claims is not limited to the described features or methods. Instead, this document discloses the described features and methods as example implementations of erroneous SDA detection.

What is claimed is:

1. An apparatus comprising:
   multiple memory dice;
   a command bus coupled to the multiple memory dice and configured to be shared by the multiple memory dice; and
   logic coupled to the command bus and configured to:
      detect signaling that conflicts with a protocol enabling selective masking of a die of the multiple memory dice, the masking effective to prevent the die from implementing a command received via the command bus; and
      provide an indication of the detection of the signaling that conflicts with the protocol enabling selective masking of the die.

2. The apparatus of claim 1, wherein:
   the apparatus further comprises a first register; and
   the logic is configured to, in response to the detection of the signaling that conflicts with the protocol enabling selective masking of the die, write a first value in the first register.

3. The apparatus of claim 2, wherein the logic is further configured to:
   determine that a first command to enable the protocol enabling selective masking of the die has or has not been received; and
   determine that a second command to mask the die of the multiple memory dice has or has not been received.

4. The apparatus of claim 3, wherein the logic is further configured to:
   determine that the first command has been received;
   determine that the second command has not been received;
   determine that a predetermined period of time has elapsed since the first command has been received; and
   write the first value in the first register in response to the determination that the predetermined period of time has elapsed without reception of the second command.

5. The apparatus of claim 4, wherein the predetermined period of time is between approximately 100 microseconds and 10 milliseconds.

6. The apparatus of claim 4, wherein the logic is further configured to:
   store multiple periods of time for the predetermined period of time; and
   receive signaling indicative of a third command to select the predetermined period of time from the multiple periods of time that are stored.

7. The apparatus of claim 6, wherein at least one of the multiple periods of time for the predetermined period of time that are stored is approximately 100 microseconds, 500 microseconds, 2 milliseconds, or 10 milliseconds.

8. The apparatus of claim 4, wherein:
   the apparatus further comprises a second register; and
   the logic is further configured to write a second value to the second register indicative of the predetermined period of time.

9. The apparatus of claim 3, wherein the logic is further configured to:
   determine that the second command has been received;
   determine that the first command has not been received; and
   write the first value in the first register in response to the determination that the second command has been received and the determination that the first command has not been received.

10. The apparatus of claim 2, wherein the logic is further configured to disable the protocol enabling selective masking of the die responsive to the detection of the signaling that conflicts with the protocol enabling selective masking of the die.

11. The apparatus of claim 10, wherein:
    the apparatus further comprises a second register and a third register; and
    the logic is further configured to:
       read a second value from the second register, the second value indicative that the logic is configured to disable the protocol enabling selective masking of the die; and
       write, based on the second value, a third value to the third register effective to disable the protocol enabling selective masking of the die in response to the detection of the signaling that conflicts with the protocol enabling selective masking of the die.

12. The apparatus of claim 2, wherein the logic is further configured to write, after writing the first value in the first register, a second value in the first register, the second value being different from the first value, in response to at least one of:
    a reception of a first command to enter a select die access mode in accordance with the protocol enabling selective masking of the die;
    a power cycle of the multiple memory dice;
    a reset of the multiple memory dice; or
    a reception of a second command to disable the logic from detecting the signaling that conflicts with the protocol enabling selective masking of the die.

13. The apparatus of claim 1, wherein:
the apparatus further comprises a first register; and
the logic is further configured to:
write a first value to the first register effective to enable the logic to detect the signaling that conflicts with the protocol enabling selective masking of the die; and
write a second value to the first register effective to disable the logic from detecting the signaling that conflicts with the protocol enabling selective masking of the die.

14. The apparatus of claim 1, wherein the protocol enabling selective masking of the die comprises a select die access protocol.

15. The apparatus of claim 1, wherein:
the multiple memory dice comprise at least a portion of the logic.

16. The apparatus of claim 1, wherein the protocol enabling selective masking of the die further relates to selecting for access another die of the multiple memory dice, the selected other die configured to implement the command received via the command bus.

17. The apparatus of claim 1, wherein the command bus comprises a command and address bus.

18. The apparatus of claim 1, wherein:
the apparatus comprises a Compute Express Link® (CXL®) device; and
the logic is coupled to the multiple memory dice via an interconnect that is internal to the CXL® device.

19. The apparatus of claim 1, wherein the apparatus is configured to be coupled to an interconnect that comports with at least one Compute Express Link® (CXL®) standard.

20. A method comprising:
receiving a first command to enable a protocol enabling selective masking of a die of multiple memory dice coupled to a command bus, the masking effective to prevent the die from implementing a command received via the command bus;
detecting, based on the first command, signaling that conflicts with the protocol enabling selective masking of the die; and
providing an indication of the detected signaling that conflicts with the protocol enabling selective masking of the die in response to the detecting.

21. The method of claim 20, further comprising:
after receiving the first command, determining that a second command effective to disable the protocol enabling selective masking of the die has not been received;
determining that a predetermined period of time has elapsed after receiving the first command; and
detecting signaling that conflicts with the protocol enabling selective masking of the die in response to determining that the predetermined period of time has elapsed without receiving the second command.

22. The method of claim 20, further comprising:
determining that a feature related to disabling the protocol enabling selective masking of the die is enabled; and
disabling the protocol enabling selective masking of the die in response to detecting signaling that conflicts with the protocol enabling selective masking of the die and determining that the feature related to disabling the protocol enabling selective masking of the die is enabled.

23. The method of claim 20, further comprising:
prior to detecting signaling that conflicts with the protocol enabling selective masking of the die, determining that a feature related to detecting signaling that conflicts with the protocol enabling selective masking of the die is enabled,
wherein detecting signaling that conflicts with the protocol enabling selective masking of the die is performed responsive to determining that the feature related to detecting signaling that conflicts with the protocol enabling selective masking of the die is enabled.

24. The method of claim 20, further comprising:
after providing the indication of the detection of the signaling that conflicts with the protocol enabling selective masking of the die, performing an action comprising at least one of: a reset of a memory device that includes the multiple memory dice, a power cycle of the memory device, a reception of the first command, or a reception of a second command to disable a feature related to detecting signaling that conflicts with the protocol enabling selective masking of the die; and
providing an indication that signaling that conflicts with the protocol enabling selective masking of the die has not been detected in response to performing the action.

25. A method comprising:
before receiving a first command to enable a protocol enabling selective masking of a die of multiple memory dice coupled to a command bus, the masking effective to prevent the die from implementing a command received via the command bus, receiving a second command to mask the die of the multiple memory dice;
detecting, based on the receiving of the second command, signaling that conflicts with the protocol enabling selective masking of the die; and
providing an indication of the detected signaling that conflicts with the protocol enabling selective masking of the die responsive to the detecting.

26. The method of claim 25, further comprising:
determining that the protocol enabling selective masking of the die has been enabled in response to detecting signaling that conflicts with the protocol enabling selective masking of the die; and
disabling the protocol enabling selective masking of the die in response to determining that the protocol enabling selective masking of the die has been enabled.

27. The method of claim 26, further comprising:
determining that a feature related to disabling the protocol enabling selective masking of the die is enabled in response to determining that the protocol enabling selective masking of the die has been enabled, wherein disabling the protocol enabling selective masking of the die is responsive to determining that the feature related to disabling the protocol enabling selective masking of the die is enabled.

28. The method of claim 25, further comprising:
prior to detecting signaling that conflicts with the protocol enabling selective masking of the die, determining that a feature related to enabling the detection of signaling that conflicts with the protocol enabling selective masking of the die is enabled,
wherein detecting signaling that conflicts with the protocol enabling selective masking of the die is responsive to determining that the feature related to enabling the detection of signaling that conflicts with the protocol enabling selective masking of the die is enabled.

29. A method comprising:
transmitting signaling indicative of a first command, the first command effective to enable a feature related to detecting signaling that conflicts with a protocol enabling selective masking of a die of multiple memory dice coupled to a command bus, the masking effective to prevent the die from implementing a command received via the command bus;

transmitting signaling indicative of a request to read a value from a first register, the value indicative of detected signaling that conflicts with the protocol enabling selective masking of the die;

receiving signaling indicative of the value from the first register; and performing an error handling process in response to receiving the signaling indicative of the value.

30. The method of claim 29, further comprising:
transmitting signaling indicative of a predetermined period of time, the signaling effective to configure the feature related to detecting signaling that conflicts with the protocol enabling selective masking of the die by defining a maximum allowable time between a reception of a second command to enable the protocol enabling selective masking of the die and a reception of a third command to mask the die of the multiple memory dice.

31. The method of claim 29, further comprising:
transmitting signaling indicative of a second command to enable a feature related to disabling the protocol enabling selective masking of the die responsive to detection of signaling that conflicts with the protocol enabling selective masking of the die.

32. The method of claim 29, further comprising:
transmitting the signaling indicative of the request to read the value from the first register at least once every passage of a predetermined period of time.

33. The method of claim 29, further comprising, responsive to performing an error handling process, at least one of:
transmitting signaling indicative of a second command to power cycle the multiple memory dice; or
transmitting signaling indicative of a third command to reset the multiple memory dice.

34. An apparatus comprising:
logic configured to:
transmit signaling indicative of a first command, the first command effective to enable a feature related to detecting signaling that conflicts with a protocol enabling selective masking of a die of multiple memory dice coupled to a command bus, the masking effective to prevent the die from implementing a command received via the command bus;
transmit signaling indicative of a request to read a value from a first register in response to transmitting the signaling indicative of the first command, the value indicative of detected signaling that conflicts with the protocol enabling selective masking of the die;
receive signaling indicative of the value from the first register; and
perform an error handling process in response to receiving the signaling indicative of the value.

35. The apparatus of claim 34, wherein the logic is further configured to:
transmit signaling indicative of a predetermined period of time, the signaling effective to configure the feature related to detecting signaling that conflicts with the protocol enabling selective masking of the die by defining a maximum allowable time between a reception of a second command to enable the protocol enabling selective masking of the die and a reception of a third command to mask the die of the multiple memory dice.

36. The apparatus of claim 34, wherein the logic is further configured to:
transmit signaling indicative of a second command to enable a feature related to disabling the protocol enabling selective masking of the die in response to detection of signaling that conflicts with the protocol enabling selective masking of the die.

37. The apparatus of claim 34, wherein the logic is further configured to:
transmit the signaling indicative of the request to read the value from the first register at least once every passage of a predetermined period of time.

38. The apparatus of claim 34, wherein the logic, responsive to performing an error handling process, is further configured to perform at least one of:
transmission of signaling indicative of a second command to power cycle the multiple memory dice; or
transmission of signaling indicative of a third command to reset a memory device that comprises the multiple memory dice.

39. The apparatus of claim 34, wherein:
the apparatus comprises a Compute Express Link® (CXL®) device; and
the logic is coupled to a memory device comprising the multiple memory dice via an interconnect that is internal to the CXL® device.

40. The apparatus of claim 34, wherein the apparatus is configured to be coupled to an interconnect that comports with at least one Compute Express Link® (CXL®) standard.

* * * * *